United States Patent [19]

Ninomiya et al.

[11] Patent Number: 5,872,725
[45] Date of Patent: Feb. 16, 1999

[54] QUASI-RANDOM NUMBER GENERATION APPARATUS AND METHOD, AND MULTIPLE INTEGRATION APPARATUS AND METHOD OF FUNCTION F

[75] Inventors: Syoiti Ninomiya, Tokyo; Shu Tezuka, Yokohama, both of Japan

[73] Assignee: International Business Machines Corporation, Armonk, N.Y.

[21] Appl. No.: 860,336

[22] PCT Filed: Nov. 28, 1995

[86] PCT No.: PCT/JP95/02439

§ 371 Date: Sep. 30, 1997

§ 102(e) Date: Sep. 30, 1997

[87] PCT Pub. No.: WO96/18144

PCT Pub. Date: Jun. 13, 1996

[30] Foreign Application Priority Data

Dec. 5, 1994 [JP] Japan .................................. 6-301112
Mar. 14, 1995 [JP] Japan .................................. 7/54143

[51] Int. Cl.$^6$ ........................................................ G06F 1/02
[52] U.S. Cl. ............................................... 364/717.01
[58] Field of Search ............................. 364/717.01, 746

[56] References Cited

U.S. PATENT DOCUMENTS 5,651,123  7/1997  Nakagawa et al. ................ 364/717.01

FOREIGN PATENT DOCUMENTS

| 54-64431 | 5/1979 | Japan | G06K 9/00 |
| 57-113185 | 7/1982 | Japan | G06K 9/62 |
| 61-5383 | 11/1986 | Japan | G06K 9/36 |
| 3156589A | 4/1991 | Japan | G06K 9/72 |
| 3225578 | 4/1991 | Japan | G06K 9/34 |
| 444187 | 2/1992 | Japan | G06K 9/62 |

OTHER PUBLICATIONS

P.P Boyle, New Variance Reduction Methods for Efficient Monte Carlo Simulations, Conference on Advanced Mathematics on Derivatives, Risk Magazine (Sep., 1994).

P. Bratley, B.L. Fox, and H. Niederreiter, Implementation and Tests of Low–Discrepancy Sequences, ACM Trans. Modeling and Computer Simulation, 2, (Jul., 1992), 195–213.

*Primary Examiner*—Tan V. Mai
*Attorney, Agent, or Firm*—Kenneth A. Seaman; Norman L. Gundel

[57] ABSTRACT

A method of generating a low-discrepancy sequence at high speed including the steps of: (a) expanding an i-th coordinate value $u^{(1)}$ ($1 \leq i \leq k$) of an n-th element ($U_n(1), \ldots, U_n(k)$) of the low-discrepancy sequence in radix b, and storing m components generated by the expansion of each said coordinate value in sequence into a first storage, wherein the n is an integer equal to or more than 1 and the b is a prime number equal to or more than k; (b) expanding the number n in radix b, and storing the generated expansion $(n_m{}^{(1)}, n_{m-1}, \ldots, n_1)$ in sequence into a second storage; (c) scanning the second storage in sequence, and detecting a minimum order j, wherein n is not equal to b−1; (d) in response to the step (c), reading out j-th row components of a generator matrix $T^{(1)}$ for the i-th coordinate ($1 \leq i \leq k$) of the low-discrepancy sequence, stored in advance, and the components generated by the expansion of said i-th coordinate value of the n-th element of the low-discrepancy sequence in sequence, and adding said j-th row components and the components generated by the expansion of the i-th coordinate value of th n-th element of the low-discrepancy sequence in modulo b, both read out in the same order, and storing the result of the addition in sequence into third storage.

29 Claims, 6 Drawing Sheets

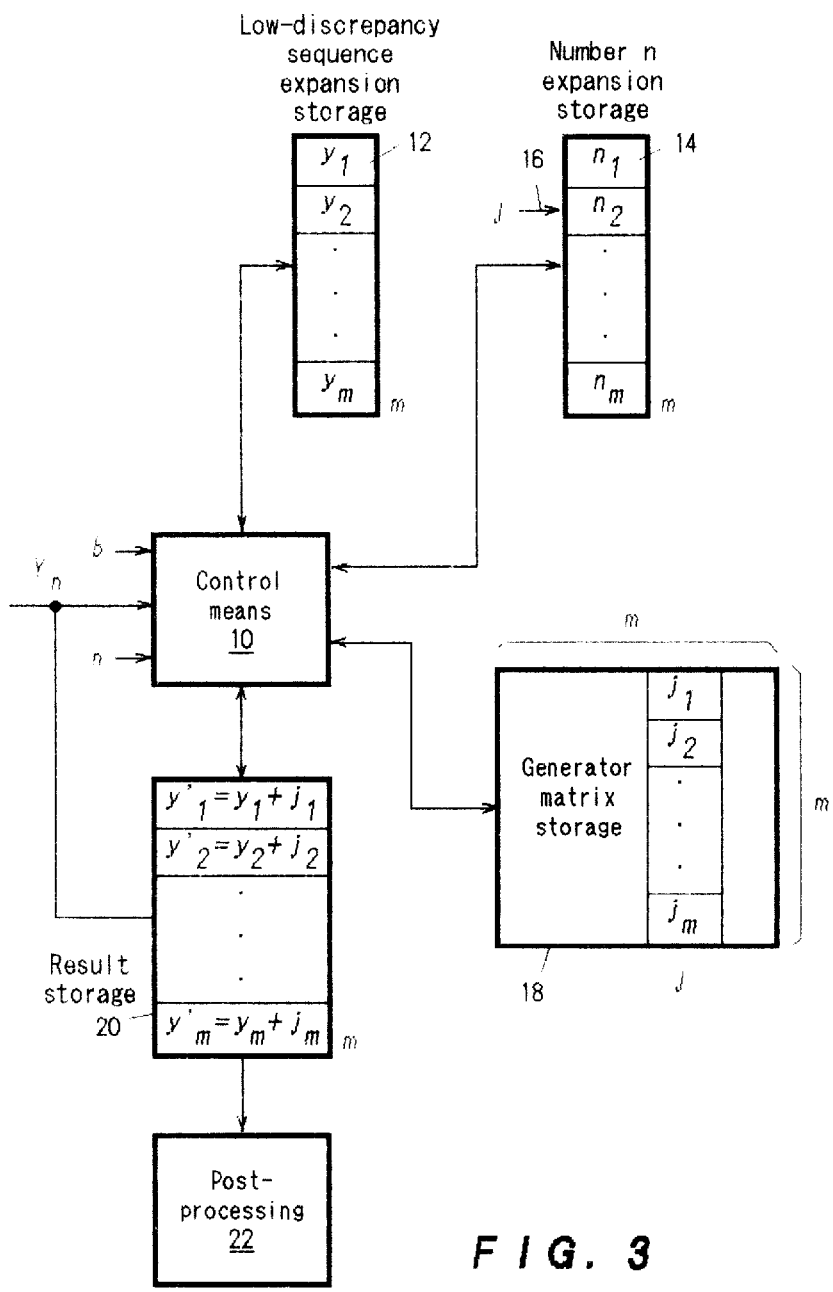
F I G. 3

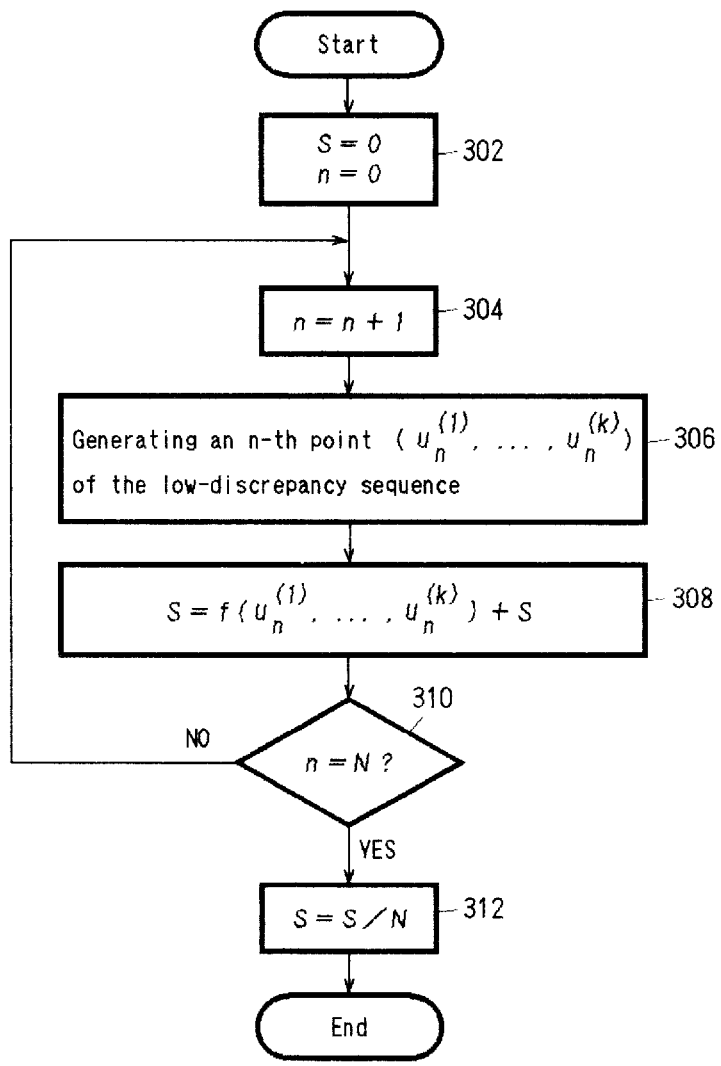
F I G. 5

QUASI-RANDOM NUMBER GENERATION APPARATUS AND METHOD, AND MULTIPLE INTEGRATION APPARATUS AND METHOD OF FUNCTION F

BACKGROUND OF THE INVENTION

1. Field of the Invention

This invention relates to a method and system for generating a low-discrepancy sequence including a Generalized Nierderreiter Sequence and a Generalized Faure sequence at high speed. This low-discrepancy sequence is a sequence of extremely uniformly distributed points.

2. Description of the Prior Art

With the recent trend of liberalization of interest rates, various financial institutions, such as banks or securities corporations, have come to make the most of a high speed computer for pricing a derivative security and like purposes. The reason for using the high speed computer is because there is a necessity of promptly responding to the demand of customers in spite of great many factors of fluctuation such as various customer-dependent parameters and economic indicators.

As a field of providing a mathematical model for such finances and an algorithm for rationally solving an equation in the mathematical model, a financial engineering is proposed and has recently formed an active study.

Calculations required for the financial engineering, especially for pricing a derivative security include a multiple integral. Generally, for computer-used integral, a technique of equi-partitioning the integral interval into an infinitesimal regions and accumulating the product of a value of function in each subinterval and a width of subinterval is used. In a multiple integral calculation, if a k-fold multiple integral, $N^k$ iterations of calculation for N partitions in one integral interval are necessary. Even for k=5, a calculation time with a practical number N of partitions exceeds the practicable limits for processing with an ordinary computer.

For this reason, a method for calculating a multiple integral, called a Monte Carlo method by use of a certain type of random numbers has so far been proposed. This method comprises the steps of: generating a plenty of k-dimensional coordinates of uniform random numbers within the limits of k-dimensional integral intervals for a multiple integral; successively substituting the generated coordinates in the function to be integrated; and evaluating the probability of the substituted values to satisfy a predetermined condition.

This is expressed with the following formula:

$$\int_{[0,1]^k} f(x)dx \approx \frac{1}{N} \sum_{i=1}^{N} f(x_i)$$

In this case, to give a set of N points $x_i$ (i=1, ..., N) is the algorithm itself. For calculating the expected value of prices in pricing a derivative security, an f(x) determined from each stochastic model is used in this formula.

In addition, in this type of problems, an algorithm serving to reduce an error in integral is a "good algorithm". On the other hand, from a consideration with the error kept constant (e.g., 0.001), a "good algorithm" is one in which the target error can be attained by using a set of the fewest possible points (i.e., smaller N). Since the computational time is generally proportional to the number of points in such an algorithm, a "good algorithm" also means a "rapid algorithm".

In the Monte Carlo method in which random points generated by a linear congruence method are used, it is known that the error is almost proportional to an inverse number of the square root of N. Following this and briefly saying, $10^6$ points are required for attaining an error of 0.001.

On the other hand, there is also an algorithm with a low-discrepancy sequence used as a set of N points. In this case, it is known that the error is theoretically almost proportional to 1/N. According to this, $N=10^3$ points are enough for attaining an error of 0.001. Accordingly, using a low-discrepancy sequence enable a $10^3$ times faster computation than that of the Monte Carlo.

Some methods for forming a low-discrepancy sequence are proposed, but a sequence called a Faure sequence is regarded as promising for calculating a high-dimensioned multiple integral by those skilled in the art. For further details, refer to the following treatise: P. P. Boyle, New Variance Reduction Methods for Efficient Monte Carlo Simulations, Conference on Advanced Mathematics on Derivatives, RISK Magazine (September, 1994).

Furthermore, as an algorithm of this sequence, a technique described in the following treatise is known and currently used.

P. Bratley, B. L. Fox, and H. Niederreiter, Implementation and Tests of Low-Discrepancy Sequences, ACM Trans. Modeling and Computer Simulation, 2, (July, 1992), 195–213.

In accordance with experiments by the inventors, however, generating a Faure sequence by the method described in this paper takes, in fact, 60 times longer time than that of the linear congruence method.

Especially in a calculation for pricing a derivative security, calculating a multiple integral by using a low-discrepancy sequence achieves theoretically about 100 times the speed achieved by using an ordinary Monte Carlo method in many cases, but only on assumption that the time taken for generating one point is almost identical between the low-discrepancy method and the linear congruence method in the Monte Carlo method. If generating a Faure sequence takes 60 times the time taken for generating a random sequence of the linear congruence method, the benefit from using a low-discrepancy is reduced to a great extent.

SUMMARY OF THE INVENTION

It is one object of the present invention to provide a method and system for generating a low-discrepancy sequence at high speed.

It is another object of the present invention to highly speed up the calculation of a multiple integral used for pricing a derivative security and for the like by using the low-discrepancy sequence thus generated.

In according to the present invention, a conventional sequence $X_n=Tv_n$ is replaced with $Y_n=TGv_n$, where the G is a square matrix in which all diagonal components are 1, ij components for j−i=1 are −1 and the other components are 0.

Then, according to a non-obvious knowledge on the invention, an n+1-th element of the low-discrepancy sequence is calculated by determining the minimum j in a vector $v_n=(n_1, \ldots n_{m-1}, n_m)$ whose components consist of the b radix expansion of a number n $(n_m, n_{m-1}, \ldots n_1)$ wherein $n_j$ is not equal to b−1, and adding the j-th row of the generator matrix T and the n-th element of the low-discrepancy sequence in module b. This is represented by $Y_{n+1}=Y_n \text{ ADD}_b \text{ Te}_j$. At this time, since only the addition is substantially required, a low-discrepancy can be calculated at a high speed with a by far smaller amount of calculations than that of a method requiring the mutual multiplication of all matrix components between the matrices.

Also, performing the calculations in a plurality of processors can provide a higher-speed system and method. This is based on the use of the property of the above matrix G, and an element $Y_n$ of the low-discrepancy sequence in any order can be created from $Y_n=TGv_n$ for a given n. Using this relation, when the number s for the processing in each processor is given to a plurality of processors, each processor generates $Y_s$ for the number s. If $Y_s$ is created, $Y_{s+1}$ can be created in the above way of addition without multiplication. Thus, if each processor generates low-discrepancy sequences from $Y_{s+1}$ to $Y_t$ by iterating the processing wherein the number t corresponds to a processing terminate number in each processor, the low-discrepancy sequences can be created at a higher speed as the whole system. However, in some integrands, the calculation for the integrand may take much time than generating the low-discrepancy sequence. So, there may be no large difference in processing time for some integrands whether in a way of addition following $Y_{n+1}=Y_n\text{ADD}_b\text{Te}_j$ without the multiplication or in a way of using the above multiplication and therefore the latter way may be used in this case for generating the low-discrepancy sequence from $Y_{s+1}$ to $Y_t$ in each processor.

More concrete constitution of the present invention is described below.

For generating one dimensional low-discrepancy sequence, following elements are necessary, that is, (a) means for expanding a value of the n-th element $Y_n$ of the low-discrepancy sequence in radix b and storing m components ($Y_1, \ldots Y_{m-1}, y_m$) generated by the expansion into a first storage means in sequence wherein the above n is an integer equal to or more than 1 and the above b is a prime number equal to or more than 2; (b) means for expanding the number n in radix b, and storing the generated expansion ($n_m, n_{m-1}, \ldots, n_1$) in sequence into a second storage means; (c) means for scanning the second storage means in sequence and detecting a minimum order j wherein $n_j$ is not equal to b−1; (d) means in response to the means (c) for reading out j-th row components ($j_1, \ldots j_{m-1}, j_m$) of a low-discrepancy sequence generator matrix T stored in advance and components of the low-discrepancy sequence Yn stored in the first storage means in sequence, adding the j-th row components $j_i$ of the generator matrix T and the components $y_i$ of the low-discrepancy sequence Yn in module b, both read out in the same order, and storing the results of the addition in sequence into a third storage means. Thus, the present invention solves the technical problem of a time-consuming matrix multiplication and can provide an apparatus for the high-speed generation of the low-discrepancy sequence to be used in a computer.

In addition, for generating a k-dimensional low-discrepancy sequence, the following steps are necessary, that is, (a) expanding an i-th coordinate value $u_n^{(i)}$ ($1 \leq i \leq k$) of an n-th element ($u_n^{(1)}, \ldots, u_n^{(k)}$) of the low-discrepancy sequence in radix b, and storing m components generated by the expansion of each coordinate value in sequence into a first storage means, wherein the above n is an integer equal to or more than 1 and the above b is a prime number equal to or more than k; (b) expanding the number n in radix b, and storing the generated expansion ($n_m, n_{m-1}, \ldots, n_1$) in sequence into a second storage means; (c) scanning the second storage means in sequence, and detecting a minimum order j wherein $n_j$ is not equal to b−1; (d) in response to the detecting step, reading out j-th row components of a generator matrix $T^{(i)}$ for the i-th coordinate ($1 \leq i \leq k$) of the low-discrepancy sequence, stored in advance, and the components generated by the expansion of the i-th coordinate value of the n-th element of the low-discrepancy sequence in sequence, and adding the j-th row components and the components of the i-th coordinate value of the n-th elements of the low-discrepancy sequence in module b, both read out in the same order, and storing the result of the addition in sequence into a third storage means.

For calculating a multiple integral of a function f using such a k-dimensional low-discrepancy sequence, the following steps are necessary, that is, (a) defining a function $f(x_1, x_2, \ldots, x_k)$ related to k elements; (b) expanding an i-th coordinate value $u_n^{(i)}$ ($1 \leq i \leq k$) of an n-th element ($u_n^{(1)}, \ldots, u_n^{(k)}$) of the low-discrepancy sequence in radix b, and storing m components generated by the expansion of each coordinate value in sequence into a first storage means, wherein the above n is an integer equal to or more than 1 and the above b is a prime number equal to or more than k; (c) expanding the number n in radix b, and storing the created expansion ($n_m, n_{m-1}, \ldots, n_1$) in sequence into a second storage means; (d) scanning the second storage means in sequence, and detecting a minimum order j wherein $n_j$ is not equal to b−1; (e) in response to the detecting step, reading out j-th row components of a generator matrix $T^{(i)}$ for an i-th coordinate value ($1 \leq i \leq k$) of the low-discrepancy sequence, stored in advance, and the components generated by the expansion of the i-th coordinate value of the n-th elements of the low-discrepancy sequence in sequence, and adding the j-th row components and the components generated by the expansion of the i-th coordinate value of the n-th element of the low-discrepancy sequence in module b, both read out in the same order, and storing the results of the addition in sequence into a third storage means; (f) inverted-expanding the m results of the addition in radix b, and storing the generated value $u_{n+1}^{(i)}$ into a fourth storage means; (g) calculating a value of $f(u_{n+1}^{(1)}, \ldots, u_{n+1}^{(k)})$ when a coordinate value $u_{n+1}^{(i)}$ ($1 \leq i \leq k$) is stored into the fourth storage by the step (f); (h) iterating the step (b) to (g) so as to accumulate a value of generated $f(u_{n+1}^{(1)}, \ldots, u_{n+1}^{(k)})$ from n=1 to n=N by an accumulator, wherein the N is a predetermined integer greater than 1; and (i) in response to the accumulator, dividing the accumulated value by N. In this way, an integral value is calculated at high speed.

Furthermore, as described above, when the mentioned apparatus for generating a low-discrepancy sequence is applied to a parallel processing, a system for generating a low-discrepancy sequence, which has a plurality of processors, means for transmitting processing assignment information including a processing start number s to each of the plurality of processors, is constructed. Then each of the plurality of processors has (a) means for receiving the processing assignment information, and generating an element ($u_s^{(1)}, \ldots, u_s^{(k)}$) of the low-discrepancy sequence corresponding to the processing start number s, and storing the created low-discrepancy sequence into a first storage means; (b) means for expanding an i-th coordinate value $u_n^{(i)}$ ($1 \leq i \leq k$) of an n-th element ($u_n^{(1)}, \ldots, u_n^{(k)}$) of the low-discrepancy sequence in radix b, and storing m components generated by the expansion of each coordinate value in sequence into a second storage means, wherein the b is a prime number equal to or more than k; (c) means for expanding the number n in radix b, and storing the generated expansion ($n_m, n_{m-1}, \ldots, n_1$) in sequence into a third storage means; (d) means for scanning the third storage means in sequence, and detecting a minimum order j wherein $n_j$ is not equal to b−1; (e) means, in response to the scanning and detecting means, for reading out j-th row components of a generator matrix $T^{(i)}$ for the i-th coordinate of the low-discrepancy sequence, stored in advance, and the components generated by the expansion of the i-th coordinate value of the n-th element of the low-discrepancy sequence in sequence, and adding the j-th row components and the components generated by the expansion of the i-th coordinate value of the n-th element of the low-discrepancy sequence in module b, both read out in the same order, and storing the results of the addition in sequence into a fourth storage means; (f) means for inverted-expanding the m results of the addition in radix b, and storing the generated value $u_{n+1}^{(i)}$ into the first storage means; and (g) means for controlling the means (b) to (f) so as to store the low-discrepancy sequence from s+1-th element to t-th element into the first storage means, wherein the t corresponds to a processing terminate number in the processor, and the s+1-th element of the low-discrepancy sequence is $(u_{s+1}^{(1)}, \ldots, u_{s+1}^{(k)})$ and the t-th element of the low-discrepancy sequence is $(u_t^{(1)}, \ldots, u_t^{(k)})$. Thus, the total amount of calculations in individual processors naturally is reduced by the number of processors, thereby leading to a speedier calculation.

It is thinkable that the means (a) in each processor of this system for generating a low-discrepancy sequence is arranged to include means for calculating a b-radix expansion $(n_m, n_{m-1}, \ldots, n_1)$ of the number n and generating the i-th coordinate value $u_n^{(i)}$ of an n-th element of the low-discrepancy sequence by using the vector $v_n = (n_1, \ldots, n_{m-1}, n_m)$ generated from the calculation result and the generator matrix $T^{(i)}$ ($1 \leq i \leq k$) and a matrix G.

$$G = \begin{bmatrix} 1 & -1 & & & \\ & 1 & -1 & & \\ & & \ldots & & \\ & & & 1 & -1 \\ & & & & 1 \end{bmatrix} \pmod{b}$$

Of course, this system for generating a low-discrepancy sequence in parallel processing is applicable to a system for calculating a multiple integral of a function f in parallel processing.

Furthermore, another form of the system for generating a low-discrepancy sequence in parallel processing comprises: a plurality of processors, means for transmitting processing assignment information including a processing start number s to each of the plurality of processors. Each processor includes (a) means for receiving the processing assignment information, (b) generator means for calculating a b-radix expansion $(n_m, n_{m-1}, \ldots, n_1)$ of the number n and generating the i-th coordinate value $u_n^{(i)}$ of an n-th element of the low-discrepancy sequence by using the vector $v_n$ generated from the calculation result and generator matrix $T^{(i)}$ ($1 \leq i \leq k$) and a matrix G, $$G = \begin{bmatrix} 1 & -1 & & & \\ & 1 & -1 & & \\ & & \ldots & & \\ & & & 1 & -1 \\ & & & & 1 \end{bmatrix} \pmod{b}$$

and (c) control means for inputting the number n ($s \leq n \leq t$) and the generator matrix $T^{(i)}$ ($1 \leq i \leq k$) and the matrix G to the generator means so that the generator means generates the low-discrepancy sequence from $(u_s^{(1)}, \ldots, u_s^{(k)})$ corresponding to the processing start number s to $(u_t^{(1)}, \ldots, u_t^{(k)})$ corresponding to a processing terminate number t in the processor. This form of the present invention calculates the low-discrepancy sequence more slowly than in the aforementioned system for generating a low-discrepancy sequence, but a sufficient speed of calculations can be obtained on account of a parallel processing, say, if the integrand f is complicated and it takes much time to evaluate the integrand f in a later integral calculation. Moreover, when each of the plurality of processors calculates the same number of the low-discrepancy sequence, it is possible to eliminate the transmission of the processing start number s.

Of course, this form of the present invention is applicable to a system for calculating a multiple integral of a function f.

BRIEF DESCRIPTION OF THE DRAWINGS

FIG. 3 is a block diagram showing an apparatus configuration for implementing the present invention;

FIG. 5 is a flowchart showing the processing of calculating a multiple integral of a function f;

Figure 1:
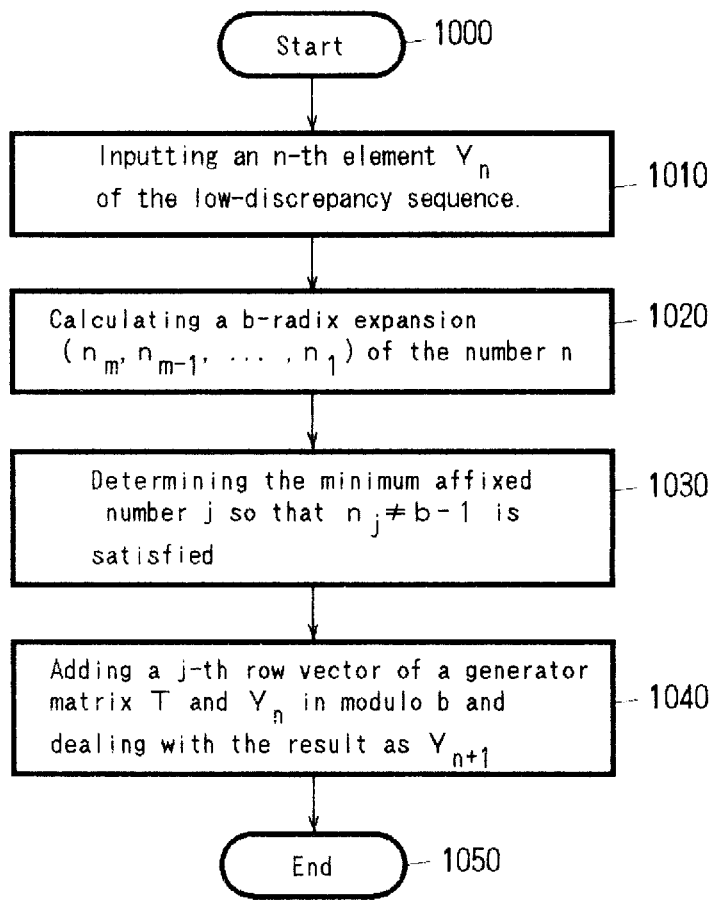
FIG. 1 is a flowchart showing the processing of generating a 1-dimensional low-discrepancy sequence.

In addition, main symbols used in these figures are explained as follows:
10 Control means
12, 16, 18, 20, 32 Storage means
16 Pointer
22 Post-processing block
30 Inverted-expansion means
34 Operating means
36 Accumulator
40 System control means
42, 44, 46 Processor

DETAILED DESCRIPTION OF THE PREFERRED EMBODIMENT

A. Principle of the invention

Hereinafter, description will be performed for convenience in one dimension. However, this description can be easily extended to k- dimension as described later.

Express a sequence in $X_n$ ($n=0, 1, 2, \ldots, b^{m-1}$) where b is a prime number equal to or greater than the dimension k and m is normally an integer near to $\log_b 2^{30}$. By definition, the sequence $X_n$ can be written as $X_n = T v_n$ by using a generator matrix $T = (c_{ij})$. As for selecting such a matrix T, refer to the above-mentioned treatise by P. Bratley et al. Here, the vector $v_n$ corresponds to $^t(n_1, \ldots, n_m)$ where a b-radix representation of the integer $n = n_m b^{m-1} + \ldots n_2^b + n_1$.

Since a multiplication of matrices $X_n = T v_n$ was carried out as it is in the above-mentioned treatise by P. Bratley et al, a very large amount of time was taken for calculation.

On the other hand, according to the present invention, a sequence $Y_n$ is created by using $Y_n=TGv_n$ instead of direct multiplication of matrices in $X_n=Tv_n$. The sequence $Y_n$ is $Y_n$ (n=0, 1, . . . , $b^m-1$) and b is a prime number equal to or greater than the dimension k as well. Here, the matrix G is a sparse matrix in which all diagonal elements ii (i=1, . . . , m) are 1 in module b, the right elements adjacent thereto ij (j−1=i, 1≦i≦m, 1≦j≦m) are −1, and the other elements are 0. Such a matrix G is regular and accordingly $Y_n$ itself is at once found to be a low-discrepancy sequence:

$$G = \begin{bmatrix} 1 & -1 & & & \\ & 1 & -1 & & \\ & & \ldots & & \\ & & & 1 & -1 \\ & & & & 1 \end{bmatrix} \pmod{b}$$

Hereupon, the present inventors have very non-trivially got to an idea that the following theorem holds:

THEOREM

Let $e_j$ (j=1, 2, . . . , m) be a j-th unit vector with the length of m. Then, setting $g_n=Gv_n$, $g_{n+1}=g_n \text{ ADD}_b \ e_j$ holds.

Here, $\text{ADD}_b$ represents adding in module b for each coordinate, and j is the minimum index meeting $n_j \neq b-1$ in a vector $v_n=(n_1, \ldots, n_m)$.

PROOF

Try to examine how the b-radix expression of integer n and n+1 varies when n turns into n+1. For example, setting b=3, assume n changes from 8 to 9.

Since 8=2*3+2, the 3-radix expression of 8 is (022). Accordingly, a vector $v_8$ is expressed as follows:

$$v_8 = \begin{bmatrix} 2 \\ 2 \\ 0 \end{bmatrix}$$

And, since $9=3^2$, the 3-radix expression of 9 is (100). Accordingly, a vector $v_9$ is expressed as follows:

$$v_9 = \begin{bmatrix} 0 \\ 0 \\ 1 \end{bmatrix}$$

Thus, using a 3×3 matrix G, $g_8$ and $g_9$ are calculated respectively as follows:

$$g_8 = \begin{bmatrix} 1 & -1 & 0 \\ 0 & 1 & -1 \\ 0 & 0 & 1 \end{bmatrix} \begin{bmatrix} 2 \\ 2 \\ 0 \end{bmatrix} \pmod{3} = \begin{bmatrix} 0 \\ 2 \\ 0 \end{bmatrix}$$

$$g_9 = \begin{bmatrix} 1 & -1 & 0 \\ 0 & 1 & -1 \\ 0 & 0 & 1 \end{bmatrix} \begin{bmatrix} 0 \\ 0 \\ 1 \end{bmatrix} \pmod{3} = \begin{bmatrix} 0 \\ 2 \\ 1 \end{bmatrix}$$

On the other hand, in the 3-radix expression (022) of 8, the minimum index meeting $n_j \neq 3-1=2$ is j=3. So, calculating $g_8 \text{ ADD}_3 \ e_3$ results in $$g_8 \text{ADD}_3 e_3 = \begin{bmatrix} 0 \\ 2 \\ 0 \end{bmatrix} \text{ADD}_3 \begin{bmatrix} 0 \\ 0 \\ 1 \end{bmatrix} = \begin{bmatrix} 1 \\ 2 \\ 1 \end{bmatrix} = g_9$$

and consequently it is found that $g_8 \text{ ADD}_3 \ e_3$ agrees with $g_9$. The generalized proof can be established for any b by using the mathematical induction concerning n.

When such an expression $g_{n+1}=g_n \text{ ADD}_b \ e_j$ holds, a matrix T is multiplied to both sides from the left and then $$Y_{n+1}=Y_n \text{ ADD}_b \ Te_j$$

is obtained because $g_n=Gv_n$ and $Y_n=TGv_n$. However, since $Te_j$ is just the j-th row components of the matrix T, $Y_{n+1}$ is evaluated only by adding the j-th row components of a matrix T to Yn in module b. At this time, although a value of j must be also determined, it is only necessary for finding the minimum index meeting $n_u \neq b-1$ to scan components of a vector $v_n$: a simple processing.

Incidentally, an attempt to generate 100,000 points by using a program created with a C compiler on IBM RISC System/6000 in accordance with both the method described in the above treatise by P. Bratley and that of the present invention revealed that the former took 60 seconds and the latter took only 7 seconds, thus proving about 8.5 times improvement in computational speed.

The algorithm described above are summarized as shown in FIG. 1. That is, (1) Inputting an n-th element $Y_n$ of the low-discrepancy sequence (step 1010). (2) Calculating a b-radix expansion ($n_m$, $n_{m-1}$, . . . $n_1$) of the number n (step 1020). (3) Determining the minimum affixed number j so that $n_j \neq b-1$ is satisfied (step 1030). (4) Adding a j-th row vector of a generator matrix T and $Y_n$ in module b, and dealing with the result as $Y_{n+1}$ (step 1040).

Then, a hardware performing these operations will be described.

Figure 2:
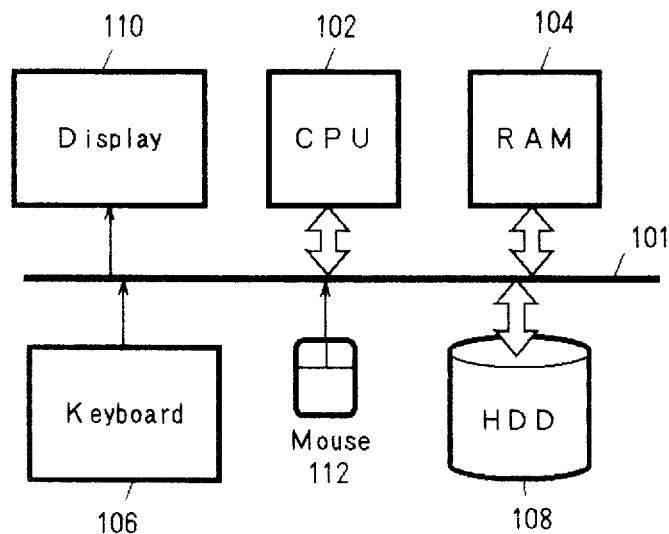
FIG. 2 is a block diagram showing an apparatus configuration (a computer) for implementing the present invention.

If those operations are executed by a computer program, the hardware configuration is as shown in FIG. 2.

This configuration is an ordinary configuration in which a CPU 102 for performing the functions of arithmetic/logic operation and I/O control, a main memory (RAM) 104 for loading a program and giving a working area for the CPU 102, a keyboard 106 for keying in a command or character string, a hard disk 108 for storing an operating system for controlling the CPU, files including the content for initializing the matrix T, a computing program for pricing a derivative security related to the present invention, a display device 110 for displaying the retrieval result of database, and a mouse 112 for pointing any point on the screen of the display device 110, and sending the positional information to the CPU are connected to a bus 101. In this embodiment, a RISC System/6000 (Trademark of IBM Corp.) sold from IBM is used. However, the present invention may be carried out using personal computer systems such as PS/2 (Trademark of IBM Corp.), PS/55 (Trademark of IBM Corp.) and the like provided likewise from IBM, and the present invention carried out in a computer program is not limited to a definite hardware configuration. As an operating system, this embodiment uses AIX (Trademark of IBM Corp.). In the case of using such a hardware configuration as PS/2 or PS/55, however, such operating systems as Windows (Trademark of Microsoft), OS/2 (Trademark of IBM Corp.), PC-DOS and MS-DOS (Trademark of Microsoft) can be used and implementing the present invention in a computer program is not limited to a definite operating system environment.

Now, FIG. 3 shows the implementation in a specific hardware. The control means 10 receives $Y_n$, number n and number b as input. For this input $Y_n$, an output from a result storage 20 may serve in some cases. The control means 10 is connected to a low-discrepancy sequence expansion storage 12 and a number n expansion storage 14 and a generator matrix storage 18 and the result storage 20. Each storage separately stores necessary data. However, these storages may be separately prepared and may be prepared in the divisions of one storages. The last output is stored in the result storage, the output of which is connected to a post-processing block 22 for the subsequent processing (for example, multiple integral of a function f). The number of storage locations in each storage in one dimension is determined as follows: Each of the low-discrepancy sequence expansion storage 12, the number n expansion storage 14, and the result storage 20 has m storage locations for accommodating the expanded components of the number n and the n-th low-discrepancy sequence $Y_n$, whereas the generator matrix storage 18 has m×m storage locations.

The control means 22, capable of performing an arithmetic operation, operates as follows:

To begin with, mention that the generator matrix T is previously stored in the generator matrix storage 18 and any row components thereof can be fetched according to the need.

First, on inputting the number n and the low-discrepancy sequence $Y_n$ for the number n, the control means 22 expands n and $Y_n$ in b-radix (b: prime number equal to or more than 2). That is, $Y_n$ is expanded into $y_m b^{m-1} + \ldots y_2 b + y_1$ and these $Y_m, \ldots, y_2, y_1$ are stored into the low-discrepancy sequence expansion storage 12 in sequence. The sequence may start either with $y_m$ or with $y_1$, but a way of fetching must correspond to the order of storing for a later processing. Similarly, the number n is also expanded into $n = n_m b^{m-1} + \ldots n_2 b + n_1$ and these $n_m, \ldots, n_2, n_1$ are stored into the number n expansion storage 14 in sequence.

Then, the control means 10 scans the number n expansion storage 14 from the storage location for $n_1$. For this scanning, a pointer 16 is used and steps from the storage location for $n_1$. A counter is incremented by 1 for each step movement of the pointer 16. The control means 10 checks $n_j \neq b-1$ in each storage location and detects the minimum counter value j meeting the condition $n_j \neq b-1$. In response to this, the control means 10 fetches the j-th row components ($j_m, \ldots, j_2, j_1$) from the generator matrix storage 18. A way of fetching these components may start either with $j_m$ or with $j_1$, but $y_m$ must be first fetched among the components of $Y_n$ if starting with $j_m$. Similarly, if starting with $j_1$, $y_1$ must be first fetched.

In either case, components of the low-discrepancy sequence expansion storage 12 and components of the generator matrix storage 18 are fetched and added in module b to calculate $j_1 + y_1, \ldots, j_m + y_m$. The calculated results are stored into the result storage 20 in sequence. In this way, the calculation of $Y_{n+1}$ is completed. Actually, because this result is $Y_{n+1}$ in a form of b-radix expansion, it is necessary to restore to the original form. But $Y_{n+1}$ in a form of b-radix expansion is used in later calculation, so the result storage 20 stores in a form of b-radix expansion.

Furthermore, when it is desired to calculate $Y_{n+2}$, $Y_{n+1}$ is now inputted from the result storage 20 into the control means 10 in place of $Y_n$. In contrast to the preceding case, no processing for expansion is required because $Y_{n+1}$ has already been expanded. Thus, the control means 10 first expands a number n+1 in radix b. In view of these matters, the result storage 20 may be used as the low-discrepancy sequence expansion storage 12. The subsequent processes will be omitted because of being the same as above.

In an apparatus shown in FIG. 3, adding b-radix expanded components of $Y_n$ stored in the low-discrepancy sequence expansion storage 12 to j-th row components of the generator matrix T stored in the generator matrix storage 18 must be performed in appropriate pairs and therefore an FIFO (First-In First-Out) buffer may be employed for arranging the order of fetching and storing.

Alternately, there is also a way in which the number n expansion storage 14 is scanned from $n_m$, the initial value of the counter is set to m and a value of the counter is decremented by 1 for each scanning step in contrast to the above scanning way in which the number n expansion storage 14 is scanned from $n_1$ and a value of the counter is incremented. However, since the minimum value j meeting $n_j \neq b-1$ is searched for, the way of decrementing the count takes more time.

Furthermore, in the above description, the number n is inputted. But it is possible that the control means 10 has a counter and increments the value of the counter by one in response to one low-discrepancy sequence being calculated, and the value of the counter is used as the input of the number n.

The above description refers to calculating $Y_{n+1}$ from $Y_n$, but actually, $Y_1$ is inputted to the control means 10 and the processing starts with this point.

B: Processing in a high dimension

On the basis of the above description, processing in generating a k-dimensional low-discrepancy sequence (in particular, Faure sequence) will be described referring to FIG. 4. This FIG. 4 shows a processing of the present invention implemented using a computer program in the apparatus shown in FIG. 2.

Herein, a processing of calculating the n+1-th point $(u_{n+1}^{(1)}, \ldots, u_{n+1}^{(k)})$ will be described for a given n-th point $(u_n^{(1)}, \ldots, u_n^{(k)})$ in a k-dimensional space. However, actually, on giving the coordinate values of a first point $(u_1^{(1)}, \ldots u_n^{(k)})$ initially and applying the processing of FIG. 4 iteratively, arbitrary number of points are generated.

It is to be noted that the above generator matrix T is separately prepared for each coordinate in the k-dimensional space. Here, an i-th generator matrix is represented in $T^{(i)}$.

Figure 4:
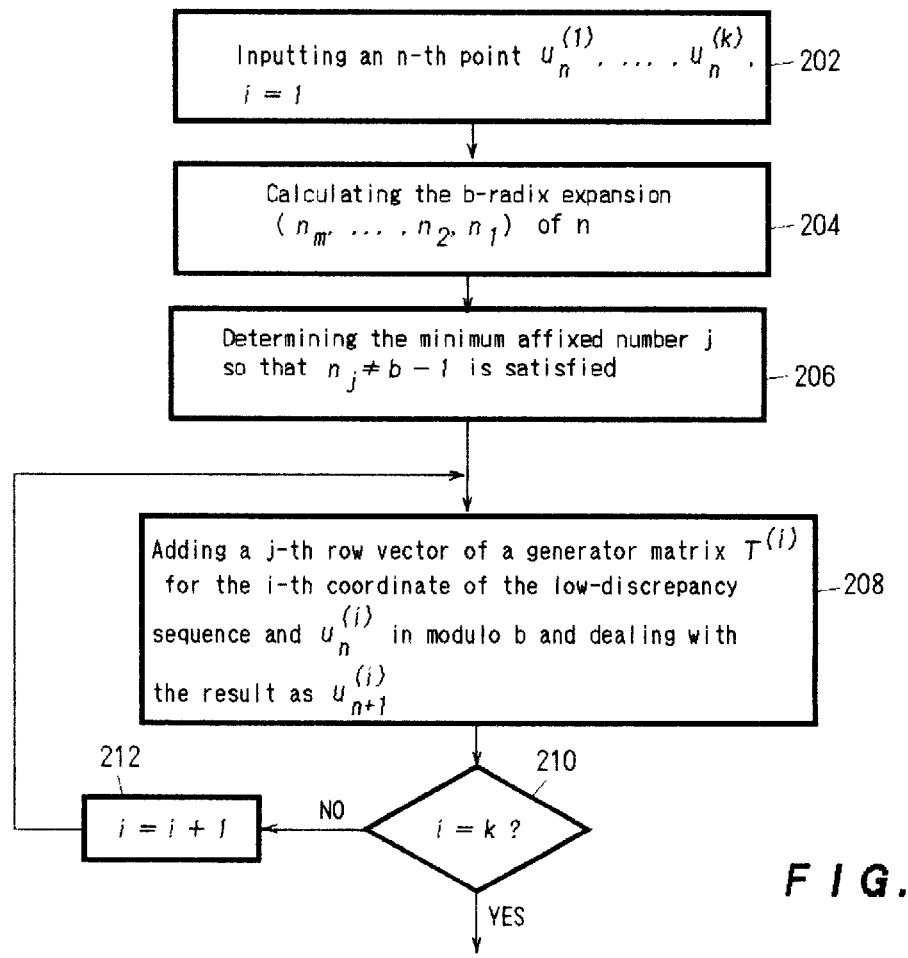
FIG. 4 is a flowchart showing the processing of generating a k-dimensional low-discrepancy sequence.

At the step 202 of FIG. 4, an n-th point $(u_n^{(1)}, \ldots, u_n^{(k)})$ in the k-dimensional space is given and a value i representing the coordinate number of a point to be generated is also set to 1.

At the step 204, n is expended in radix b following a fixed prime number b wherein b is equal to or more than the number k of dimension, a vector $(n_1, n_2, \ldots, n_m)$ in an m dimension corresponding to the number n is calculated.

At the step 206, a minimum j meeting $n_j \neq b-1$ is found by scanning the components of the vector $(n_1, n_2, \ldots, n_m)$ in the m dimension generated in the step 204.

At the step 208, a j-th row vector of the generator matrix $T^{(i)}$ for the i-th coordinate and $u_n^{(i)}$ are added in module b in accordance with the principle of the present invention to obtain $u_{n+1}^{(i)}$.

At the step 210, it is determined whether i=k or not. If yes, all coordinates of the n+1-th point are found to be calculated.

If not, all coordinates of the n+1-th point are not yet completed. So, increment i by 1 at the step 212 and then return to the step 208 to calculate the next coordinate of the n+1-th point.

Now, how to implement the present invention in a specific hardware will be described.

Though only the 1-dimensional case was considered in FIG. 3, extension to the k-dimensional is easily performed.

That is, the low-discrepancy sequence expansion storage 12 have only to comprise m×m storage locations in contrast to 1×m ones in FIG. 3. Because of having need of k generator matrices, the generator matrix storage 18 has only to comprise m×m×k storage locations in contrast to that for the single generator matrix in FIG. 3. Also in the result storage 20, it is necessary to extend to have m×m storage locations for storing individual components of coordinates of low-discrepancy sequences generated. Instead of $Y_n$, $(u_n^{(1)}, \ldots, u_n^{(k)})$ is inputted to the control means 10. In the generator matrix storage 18, management may be performed for each block of m×m storage locations storing one generator matrix T and a signal for selecting a block may be sent from the control means 10 to the generator matrix storage 18.

However, if the system is so arranged to input one $u_n^{(i)}$ at a time to the control means 10, the low-discrepancy sequence expansion storage 12 may be similar to the 1-dimensional case. Unlike the low-discrepancy sequence expansion storage 12, the generator matrix storage 18 uses different generator matrices T for different i, and different generator matrices T is needed for all i and accordingly it is necessary to have the above size of storage locations. The result storage 20 is allowable to be similar to that of the 1-dimensional case when only one $u_n^{(i)}$ is stored, but it is desirable to have as many storage locations as for the k-dimensional components because of the feedback loop from the result storage 20 to the control means 10.

C: Application to a multiple integral

Next, the processing of calculating a multiple integral by using a k-dimensional low-discrepancy sequence will be described referring to FIG. 5. FIG. 5 shows an implementation of the present invention made by using a computer program in a computer system shown in FIG. 2. Here, a function $f(x_1, x_2, \ldots, x_k)$ with k augments is assumed to be subjected to a multiple integral in a k-dimensional space spanned by each augments.

At the step 302 of FIG. 5, 0 is stored in a variable S for storing the integrated result and in a variable n for storing the number of points of the k-dimensional low-discrepancy sequence generated for calculating the integral.

At the step 304, n is incremented by 1. At the step 306, an n-th point $(u_n^{(1)}, \ldots, u_n^{(k)})$ in a k-dimensional space is generated by using the steps shown in FIG. 4.

At the step 308, $f(u_n^{(1)}, \ldots, u_n^{(k)})$ is calculated and the resultant value is added to S. Incidentally, it should be noted that the step 306 treats each $u_n^{(i)}$ ($1 \leq i \leq k$) as a vector with elements created by b-radix expansion whereas the step 308 treats each $u_n^{(i)}$ ($1 \leq i \leq k$) as a scalar value when substituting it into f.

At the step 310, it is determined whether n reaches a predetermined value N or not. If no, return to the step 304 of incrementing n by 1. Meanwhile, a value of N is determined according to a required accuracy of calculations and the accuracy improves but the time for calculations becomes longer with larger value of N. When generating a random sequence in accordance with the linear congruence method as with an ordinary Monte Carlo method, the distribution of generated points is not so wide and a sufficient accuracy cannot be obtained unless a considerably large value of N is taken. A low-discrepancy sequence exhibits an improved property about this point and the generated points give a rather better distribution than those generated by the linear congruence method, thereby enables a sufficient accuracy to be attained with a smaller value of N.

If it is determined at the step 310 that n reaches a predetermined number N, a value normalized by dividing a value of S by N is stored in S at the step 312, and finally this value of stands for a integrated value.

Figure 6:
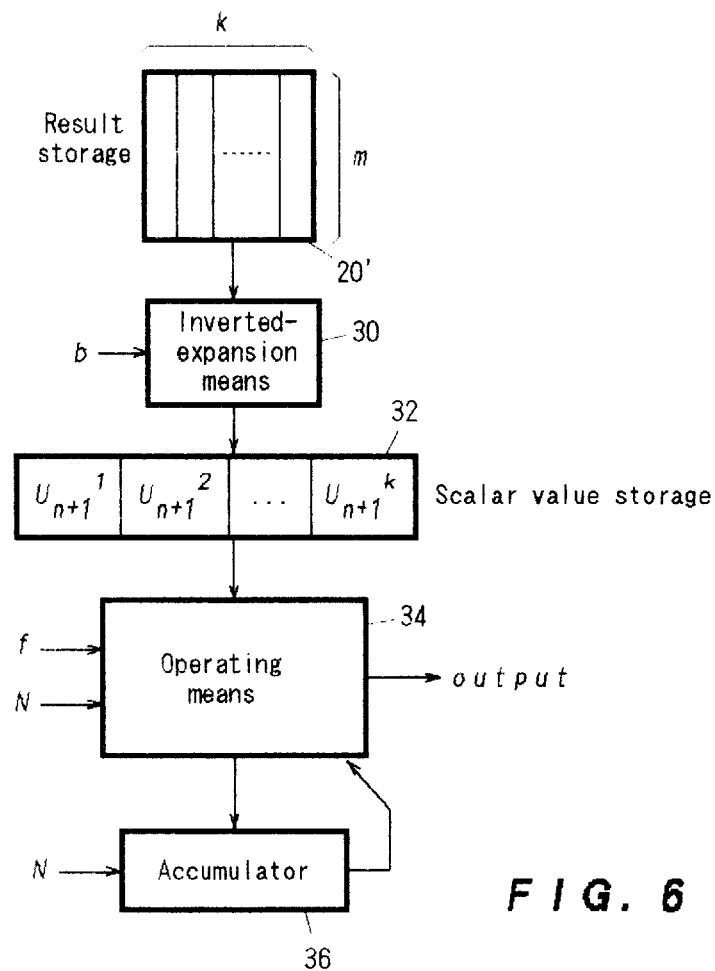
FIG. 6 is a block diagram showing an example of an apparatus for calculating a multiple integral of a function f.

Then, returning to FIG. 3, explain the post-processing block 22 for performing a multiple integral. FIG. 6 shows the details of this post-processing block 22. In FIG. 6, a result storage 20' is so extended as to have storage locations for accommodating k-dimensional components. The result storage 20' is so extended as to have storage locations for accommodating k-dimensional components. The result storage 20' is connected to an inverted-expansion means 30 having the number b as another input. This inverted-expansion means 30 is arranged to store an output in a scalar value storage 32. The scalar value storage 32 has k storage locations so as to be able to store k coordinate values for one low-discrepancy sequence. Furthermore, an operating means 34, connected to the scalar value storage 32 and receiving a function f and the number N of generated low-discrepancy sequences also as input, is connected to an accumulator 36 and an output of the accumulator 36 is returned to the operating means 34.

Next, the operations of FIG. 6 will be represented. Since the portions preceding to the result storage 20' was described in FIG. 3, the subsequent operations will be described with the components generated by the b-radix expansion of each of $u_{n+1}^{(1)}, \ldots, u_{n+1}^{(k)}$ already stored in the result storage 20'. The inverted-expansion means 30 reads out the b-radix expanded components for each of $u_{n+1}^{(1)}, \ldots, u_{n+1}^{(k)}$ from the result storage 20' and generates $u_{n+1}^{(1)}, \ldots, u_{n+1}^{(k)}$ by inverted-expanding the components for each in radix b. If the number of dimensions is k, the operating means 34 fetches $u_{n+1}^{(1)}, \ldots, u_{n+1}^{(k)}$ when the k $u_{n+1}^{(i)}$ are created.

Previously, an integrand $f(x_1, x_2, \ldots, x_k)$ is input to and set at the operating means 34. Thus, on inputting $u_{n+1}^{(1)}$ to a variable $x_i$, a value of $f(u_{n+1}^{(1)}, \ldots, u_{n+1}^{(k)})$ is calculated. This function value is output to the accumulator 36. The operating means 34 calculates function values for the low-discrepancy sequences generated successively, while the accumulator 36 accumulates function values by summing up. The accumulator 36 has a counter and returns the accumulated value to the operating means 34 after N inputs are performed from the operating means 34. Since a value of N is input thereto, the operating means 34 divides the input value from the accumulator 36 by N. In this way, a k-fold multiple integral of a function $f(x_n^{(1)}, \ldots, x_n^{(k)})$ is performed.

Detailed description in the above part was omitted, but the counter of the accumulator 36 is reset and the accumulated value is also reset at the very moment the counter comes to indicate N.

D. Application to calculations for pricing a derivative security

One example of calculation for pricing a derivative security will be described as a typical field of application requiring a calculation of the multiple integral. The following is an equation for calculating the current value E(PV) of a bill endorsed for pledge:

$$E(PV) = \int PV(i, w, a) f(i, w, a) di dw da$$

where PV is given as follows:

$$PV = C \frac{1 - w_1}{1 - i_1} + C \frac{w_1 a_k}{1 - i_1} + C \frac{(1 - w_1)(1 - w_2)}{(1 + i_1)(1 + i_2)} + \ldots$$

In the above expressions, C is a periodical payment on the mortgage, $i_t$ is the rate of interest on the month t, $w_t$ is the rate of prepayment on the month t and $a_{x-t}$ is a remaining annuity.

An actual calculation is performed over a long term and so the number of $i_t$ becomes large, thus requiring the multiple integral of about 360 dimensions in general. This takes many number of days for calculation in a conventional method, but using the technique of the present invention enables this calculation to be completed within several hours.

Since using the above method and apparatus enables the low-discrepancy sequence to be generated at high speed, calculating the multiple integral of a function f becomes also speedier. Then, consider executing a calculation in a plurality of processors.

E: Parallel processing

In the above, it was shown that $Y_{n+1}=Y_n$ $ADD_b$ $Te_j$ is equivalent to $Y_n=TGv_n$. That is, $Y_n$ for any n can be calculated by the matrix multiplication of the generator matrix T and the matrix G (shown before) and the vector $v_n$ comprising components generated by the b-radix expansion of the number n wherein b is a prime number equal to or greater than 2. It based upon the property of the matrix G that the calculation can cope with any n. And, once $Y_n$ is generated, $Y_{n+1}$ is calculated by using the above relation $Y_{n+1}=Y_n ADD_b Te_j$ in accordance with a high-speed method without matrix multiplication. Since $Y_n$ can be calculated for any n, no idle calculation with $Y_{n+1}=Y_n$ $ADD_b$ $Te_j$ is necessary from 1 to a needed n. This is important.

Figure 7:
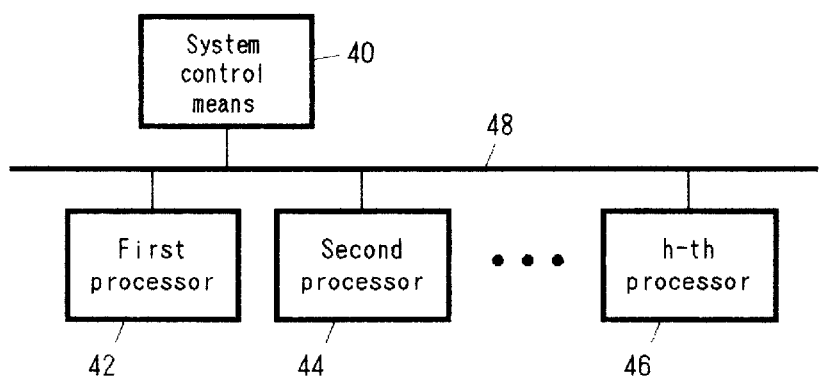
FIG. 7 is a block diagram showing one example of a system configuration in a parallel processing using a plurality of processors.
Figure 8:
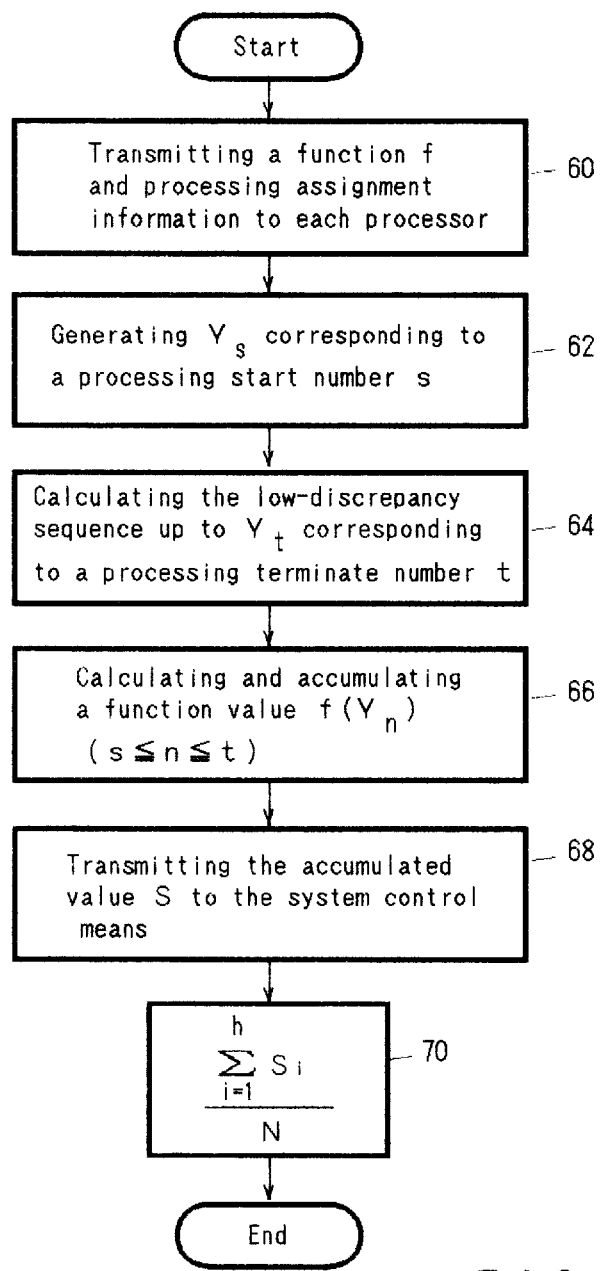
FIG. 8 is a flowchart in calculating a multiple integral of a function f in parallel processing.

With this in mind, refer to FIG. 7 and FIG. 8.

FIG. 7 shows a system in which a plurality of processors (42, 44, 46) and a system control means 40 is connected through a bus 48. This system control means 40 may be provided in addition to processors such as a first processor 42 or may be included in one of the plurality of processors (42, 44, 46). And the system control means 40 may be the same processor type as the first processor's type, etc, or may be special type processor.

Operations of this system will be described referring to FIG. 8. The system control means 40 identifies the number of processors available for the processing in this system and the ID of the available processors and calculates to which processor and which portion of all the low-discrepancy sequence should be assigned. If there is no deviation in jobs of the whole system, a uniform assignment is proper to individual processors. However, a processing start number s and a processing terminate number t is generally given as processing assignment information. The terminate number t can be replaced with the number of low-discrepancy sequences to be generated in the relevant processor. In addition, if processing is always assigned uniformly to each each processor need not be informed of the number of the low-discrepancy sequence to be generated or the processing terminate number t for each start of processing and accordingly sending them may be omitted (step 60).

Each processor receives the respective different processing start number s and generates $Y_s$ following $Y_n=TGv_n$ (step 62). Capability of generating $Y_s$ for any s in this way owes to the property of the matrix G as mentioned above.

Once $Y_s$ can be generated, the low-discrepancy sequence up to $Y_t$ corresponding to the processing terminate number t received is generated following $Y_{n+1}=Y_n ADD_b Te_j$ (step 64). Because of having been mentioned above, details of this processing will be omitted. The processing can be implemented using the procedure shown in FIG. 4 and the apparatus (including the extension thereof) shown in FIG. 3. Furthermore, when performing a multiple integral in the present invention, an integrand f must be also evaluated, but the step 64 may use either $Y_{n+1}=Y_n ADD_b Te_j$ or $Y_n=TGv_n$ if it takes much time to evaluate the integrand f. This is because the whole execution time may become substantially the same if using the calculation method following $Y_{n+1}=Y_n ADD_b Te_j$ or using that following $Y_n=TGv_n$ in which matrix multiplication is performed for each time. In view of solely generating a low-discrepancy sequence, however, it is evident that calculation following $Y_{n+1}=Y_n ADD_b Te_j$ is speedier.

After the assigned elements of the low-discrepancy sequence from $Y_s$ to $Y_t$ are generated in each processor or every time when each low-discrepancy sequence is generated, substitution into a function f sent from the system control means 40 is performed. Adding all calculated function values $f(Y_n)$ ($s \leq n \leq t$) together, $S_i$ is calculated wherein a number i is the number of the processor and the number of processors is h (step 66).

This calculated value $S_i$ ($1 \leq i \leq m$) is sent from all processors to the system control means 40 (step 68). The system control means 40 adds all sent $S_i$ together and divides the sum by N the number of all the low-discrepancy sequence (step 70). With this, calculating the multiple integral of a function f is completed.

In the above description, after a value of function $f(Y_n)$ is calculated for each generated low-discrepancy sequence, all obtained values are added together in each processor, but the obtained values may be sent to the system control means 40 before addition. However, some other processing may be delayed on account of the traffic of the bus 48, transmission processing in each processor or the like. Also, at the time the low-discrepancy sequence is generated in each processor, it is also possible to send the obtained sequence to the system control means 40. In this case, sending a function f to each processor becomes needless. The problems in such a case is similar to those of sending the values of function prior to the addition.

When each processor includes the apparatus shown in FIG. 3 and FIG. 6, a modification is needed in which an output from the accumulator 36 in FIG. 6 is put to output from the relevant processor rather than being returned to the operating means 34. In addition, the accumulator 36 requires input of N generated low-discrepancy sequence but N must be replaced with "1", then division by N is performed in the system control means 40 once. If the number of the low-discrepancy sequence calculated in each processor is the same, it is possible that N is replaced with the number of the low-discrepancy sequence processed in the processor.

In the above description of the parallel processing, $Y_n$ is employed for simplification, but extension to $(u_{n+1}^{(1)}, \ldots, u_{n+1}^{(k)})$ is possible as mentioned above and accordingly this means the processing of a multiple integral for $(u_{n+1}^{(1)}, \ldots, u_{n+1}^{(k)})$ is possible.

Incidentally, though the low-discrepancy sequence is specified to be calculated following $Y_{n+1}=Y_n ADD_b Te_j$ or $Y_n=TGv_n$ at the step 64 in FIG. 8, each processor is arranged to be computable following either relation, the system control means 40 may be arranged to detect the property of a function f and transmit the switch information indicating which method is used by each processor to each processor.

Furthermore, connecting a plurality of processing units in a distributed processing environment connected through LAN or the like and using local memories distributed in each processing unit enables processing in a huge dimensions to be coped with the above simple modification.

In the above mentioned case in which the present invention is implemented in form of the computer program, it is easily realized by a person having ordinary skill in the art that the present invention is implemented by program code corresponding to each step, and a floppy disk, CD-ROM, or MO disk etc. including the program code is distributed.

INDUSTRIAL APPLICABILITY

As described above, this invention gives marked advantages of extremely elevating the generating speed of low-discrepancy sequences by providing a technique of performing a module addition to a row of the generator matrix in successive generation of the low-discrepancy sequence. Thus, the speed of various numerical calculations (typically, multiple integral) using low-discrepancy sequence is substantially improved.

Furthermore, a parallel processing implements a high-speed calculation of low-discrepancy sequences, thereby enabling a multiple integral and the like to be calculated at high speed. In the case of the parallel processing, a sufficient calculating speed can be obtained in multiplication of matrices if the whole calculating time of a multiple integral is considered.

Incidentally, though application to calculations for pricing a derivative security was described in the above embodiment, the present invention is applicable to a wide field such as calculation physics, fluid mechanics and computer graphics. For a background of calculation techniques using such a low-discrepancy sequence, refer to, for example, J. E. Traub, H. Wozniakowski, "Breaking Intractability", SCIENTIFIC AMERICAN, January 1994.

Having thus described the invention, what is claimed is:

1. A system for generating a low-discrepancy sequence, comprising:

means for expanding a value of an n-th element of said low-discrepancy sequence $Y_n$ in radix b and storing m components $(y_1, \ldots y_{m-1}, y_m)$ generated by the expansion into first storage means in sequence wherein said n is an integer equal to or more than 1 and said b is a prime number equal to or more than 2;

means for expanding said number n in radix b, and storing said generated expansion $(n_m, n_{m-1}, \ldots, n_1)$ in sequence into second storage means;

means for scanning said second storage means in sequence and detecting a minimum order j wherein $n_j$ is not equal to b−1;

means in response to said scanning means for reading out j-th row components $(j_1, \ldots j_{m-1}, j_m)$ of a low-discrepancy sequence generator matrix T stored in advance and components of the low-discrepancy sequence Yn stored in the first storage means in sequence, adding the j-th row components $j_i$ of the generator matrix T and the components $y_i$ of the low-discrepancy sequence Yn in module b, both read out in the same order, and storing the results of the addition in sequence into third storage means.

2. A method for generating a low-discrepancy sequence, comprising the steps of:

expanding a value of an n-th element of the low-discrepancy sequence Yn in radix b and storing m components $(y_1, \ldots y_{m-1}, y_m)$ generated by the expansion into first storage means in sequence wherein said n is an integer equal to or more than 1 and said b is a prime number equal to or more than 2;

expanding said number n in radix b into a generated expression and storing said generated expansion $(n_m, n_{m-1}, \ldots, n_1)$ in sequence into second storage means;

scanning said second storage means in sequence and detecting a minimum order j wherein $n_j$ is not equal to b−1;

in response to said scanning step, reading out j-th row components $(j_1, \ldots j_{m-1}, j_m)$ of a low-discrepancy sequence generator matrix T stored in advance and components of the low-discrepancy sequence Yn stored in the first storage means in sequence, adding the j-th row components $j_i$ of the generator matrix T and the components $y_i$ of the low-discrepancy sequence Yn in module b, both read out in the same order, and storing the results of the addition in sequence into third storage means.

3. A system for generating a low-discrepancy sequence, comprising:

means for expanding an i-th coordinate value $u_n^{(i)}$ ($1 \leq i \leq k$) of an n-th element $(u_n^{(1)}, \ldots, u_n^{(k)})$ of the low-discrepancy sequence in radix b, and storing m components generated by the expansion of each said coordinate value in sequence into first storage means, wherein said n is an integer equal to or more than 1 and said b is a prime number equal to or more than k;

means for expanding said number n in radix b, and storing said generated expansion $(n_m, n_{m-1}, \ldots, n_1)$ in sequence into second storage means;

means for scanning said second storage means in sequence, and detecting a minimum order j, wherein $n_j$ is not equal to b−1;

means in response to said scanning means for reading out j-th row components of a generator matrix $T^{(i)}$ for the i-th coordinate ($1 \leq i \leq k$) of said low-discrepancy sequence, stored in advance, and said components generated by the expansion of said i-th coordinate value of said n-th element of the low-discrepancy sequence in sequence, and adding said j-th row components and said components generated by the expansion of the i-th coordinate value of the n-th element of the low-discrepancy sequence in module b, both read out in the same order, and storing the result of the addition in sequence into third storage means.

4. A method for generating a low-discrepancy sequence, comprising the steps of:

expanding an i-th coordinate value $u_n^{(i)}$ ($1 \leq i \leq k$) of an n-th element $(u_n^{(1)}, \ldots, u_n^{(k)})$ of the low-discrepancy sequence in radix b, and storing m components generated by the expansion of each said coordinate value in sequence into first storage means, wherein said n is an integer equal to or more than 1 and said b is a prime number equal to or more than k;

expanding said number n in radix b, and storing said generated expansion $(n_m, n_{m-1}, \ldots, n_1)$ in sequence into second storage means;

scanning said second storage means in sequence, and detecting a minimum order j, wherein $n_j$ is not equal to b−1;

in response to said scanning and detecting step, reading out j-th row components of a generator matrix $T^{(i)}$ for the i-th coordinate ($1 \leq i \leq k$) of said low-discrepancy sequence, stored in advance, and said components generated by the expansion of said i-th coordinate value of said n-th element of the low-discrepancy sequence in sequence, and adding said j-th row components and said components generated by the expansion of the i-th coordinate value of the n-th element of the low-discrepancy sequence in module b, both read out in the same order, and storing the result of the addition in sequence into third storage means.

5. A system for calculating a multiple integral of a function f, comprising:

means for defining a function $f(x_1, x_2, \ldots, x_k)$ related to k elements;

first means for expanding an i-th coordinate value $u_n^{(i)}$ ($1 \leq i \leq k$) of an n-th element $(u_n^{(i)}, \ldots, u_n^{(k)})$ of the low-discrepancy sequence in radix b, and storing m components generated by the expansion of each said value in sequence into first storage means wherein said n is an integer equal to or more than 1 and said b is a prime number equal to or more than k;

second means for expanding said number n in radix b, and storing said generated expansion $(n_m, n_{m-1}, \ldots, n_1)$ in sequence into second storage means;

means for scanning said second storage means in sequence, and detecting a minimum order j wherein $n_j$ is not equal to b−1;

means in response to said scanning means for reading out j-th row components of a generator matrix $T^{(i)}$ for an i-th coordinate value ($1 \leq i \leq k$) of said low-discrepancy sequence, stored in advance, and said components generated by the expansion of said i-th coordinate value of said n-th element of the low-discrepancy sequence in sequence, and adding said j-th row components and said components generated by the expansion of the i-th coordinate value of the n-th element of the low-discrepancy sequence in module b, both read out in the same order, and storing the result of the addition in sequence into third storage means;

means for inverted-expanding the m results of the addition in radix b, and storing said generated value $u_{n+1}^{(i)}$ into fourth storage means;

means for calculating a value of $f(u_{n+1}^{(1)}, \ldots, u_{n+1}^{(k)})$ when said fourth storage means stores a coordinate value $u_{n+1}^{(i)}$ ($1 \leq i \leq k$) into said fourth storage means;

means for controlling said expanding, scanning, reading, storing and calculating means so as to accumulate a value of generated $f(u_{n+1}^{(1)}, \ldots, u_{n+1}^{(k)})$ from n=1 to n=N, wherein said N is a predetermined integer greater than 1; and means in response to said controlling means for dividing said accumulated value by N.

6. A method for calculating a multiple integral of function f, comprising the steps of:

(a) defining a function $f(x_1, x_2, \ldots x_k)$ related to k elements;

(b) expanding an i-th coordinate value $u_n^{(i)}$ ($1 \leq i \leq k$) of an n-th element $(u_n^{(1)}, \ldots, u_n^{(k)})$ of the low-discrepancy sequence in radix b, and storing m components generated by the expansion of each said value in sequence into first storage means wherein said n is an integer equal to or more than 1 and said b is a prime number equal to or more than k;

(c) expanding said number n in radix b, and storing said generated expansion $(n_m, n_{m-1}, \ldots, n_1)$ in sequence into second storage means;

(d) scanning said second storage means in sequence, and detecting a minimum order j wherein $n_j$ is not equal to b−1;

(e) in response to said scanning and detecting step, reading out j-th row components of a generator matrix $T^{(i)}$ for an i-th coordinate value ($1 \leq i \leq k$) of said low-discrepancy sequence, stored in advance, and said components generated by the expansion of said i-th coordinate value of said n-th element of the low-discrepancy sequence in sequence, and adding said j-th row components and said components generated by the expansion of the i-th coordinate value of the n-th element of the low-discrepancy sequence in module b, both read out in the same order, and storing the result of the addition in sequence into third storage means;

(f) inverted-expanding the m results of the addition in radix b, and storing said generated value $u_{n+1}^{(i)}$ into fourth storage means;

(g) calculating a value of $f(u_{n+1}^{(1)}, \ldots, u_{n+i}^{(k)})$ when said means (f) stores a coordinate value $u_{n+1}^{(i)}$ ($1 \leq i \leq k$) into said fourth storage means;

(h) iterating steps (b) to (g) so as to accumulate a value of generated $f(u_{n+1}^{(i)}, \ldots, u_{n+1}^{(k)})$ from n=1 to n=N by an accumulator, wherein said N is a predetermined integer greater than 1; and (i) in response to said accumulator, dividing said accumulated value by N.

7. An apparatus for generating a low-discrepancy sequence, comprising:

a plurality of processors; and means for transmitting processing assignment information including a processing start number s to each of said processors, each said processor comprising:

(a) means for receiving said processing assignment information, and creating an element $(u_s^{(1)}, \ldots, u_s^{(k)})$ of the low-discrepancy sequence corresponding to said processing start number s, and storing said generated low-discrepancy sequence into first storage means;

(b) means for expanding an i-th coordinate value $u_n^{(i)}$ ($1 \leq i \leq k$) of an n-th element $(u_n^{(1)}, \ldots, u_n^{(k)})$ of the low-discrepancy sequence in radix b, and storing m components generated by the expansion of each said value in sequence into second storage means, wherein said b is a prime number equal to or more than k;

(c) means for expanding said number n in radix b, and storing said generated expansion $(n_m, n_{m-1}, \ldots, n_1)$ in sequence into third storage means;

(d) means for scanning said third storage means in sequence, and detecting a minimum order j wherein $n_j$ is not equal to b−1;

(e) means in response to said scanning and detecting means, for reading out j-th row components of a generator matrix $T^{(i)}$ for an i-th coordinate value ($1 \leq i \leq k$) of said low-discrepancy sequence, stored in advance, and said components generated by the expansion of said i-th coordinate value of said n-th element of the low-discrepancy sequence in sequence, and adding said j-th row components and said components generated by said expansion of the i-th coordinate value of the n-th element of the low-discrepancy sequence in module b, both read out in the same order, and storing the results of the addition in sequence into fourth storage means;

(f) means for inverted-expanding each said m results of the addition in radix b, and storing said generated value $u_{n+1}^{(i)}$ into said first storage means; and (g) means for controlling said means (b) to (f) so as to store said low-discrepancy sequence from s+1-th element to t-th element into said first storage means, wherein said t corresponds to a processing terminate number in each processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots u_t^{(k)})$.

8. The system for generating a low-discrepancy sequence as set forth in claim 7, wherein said means (a) includes means for calculating a b-radix expansion $(n_m, n_{m-1}, \ldots, n_1)$ of said number n and generating an i-th coordinate value $u_n^{(i)}$ of the n-th element of the low-discrepancy sequence by using said vector $v_n=(n_1, \ldots n_{m-1}, n_m)$ generated from the calculation result and the generator matrix $T^{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}.$$

9. A method for generating a low-discrepancy sequence in a computer system comprising a plurality of processors and system control means, comprising the steps of:

(a) transmitting processing assignment information including a processing start number s to each of said plurality of processors;

(b) in each said processor, receiving the processing assignment information and generating an element $(u_s^{(1)}, \ldots, u_s^{(k)})$ of the low-discrepancy sequence corresponding to said processing start number s, and storing the generated low-discrepancy sequence into first storage means;

(c) in each said processor, expanding an i-th coordinate value $u_n^{(i)}$ ($1 \leq i \leq k$) of an n-th element $(u_n^{(1)}, \ldots, u_n^{(k)})$ of the low-discrepancy sequence in radix b and storing m components generated by the expansion of each said coordinate value in sequence into second storage means, wherein said b is a prime number equal to or more than k;

(d) in each said processor, expanding said number n in radix b and storing the generated expansion $(n_m, n_{m-1}, \ldots, n_1)$ in sequence into third storage means;

(e) in each said processor, scanning said third storage means in sequence and detecting a minimum order j wherein $n_j$ is not equal to b−1;

(f) in each said processor, in response to said step (e), reading out j-th row components of a generator matrix $T^{(i)}$ for an i-th coordinate value ($1 \leq i \leq k$) of the low-discrepancy sequence, stored in advance, and said components generated by said expansion of the i-th coordinate value of said n-th element of the low-discrepancy sequence in sequence, and adding said j-th row components and said components generated by said expansion of the i-th coordinate value of the n-th element of the low-discrepancy sequence in module b, both read out in the same order, and storing the result of the addition in sequence into fourth storage means;

(g) in each said processor, inverted-expanding each said m results of the addition in radix b and storing said generated value $u_{n+1}^{(i)}$ into said first storage means; and (h) in each said processor, iterating the steps (c) to (g) so as to store said low-discrepancy sequence from the s+1-th element to the t-th element into said first storage means, wherein said t corresponds to a processing terminate number in the processor, and the s+1-th element of the low-discrepancy sequence is $(u_{s+1}^{(1)}, \ldots, u_{s+1}^{(k)})$ and the t-th element of the low-discrepancy sequence is $(u_t^{(1)}, \ldots, u_t^{(k)})$.

10. The method for generating a low-discrepancy sequence as set forth in claim 9, wherein said step (b) includes a step of calculating a b-radix expansion $(n_m, n_{m-1}, \ldots, n_1)$ of said number n and generating the i-th coordinate value $u_n^{(i)}$ of the n-th element of the low-discrepancy sequence by using said vector $v_n=(n_1, \ldots n_{m-1}, n_m)$ generated from the calculation result and a generator matrix $T^{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}.$$

11. A method for generating a low-discrepancy sequence in a computer system having a plurality of processors, comprising the steps of:

(a) in each said processor, generating an element $(u_s^{(1)}, \ldots, u_s^{(k)})$ of the low-discrepancy sequence corresponding to a predetermined processing start number s, and storing the generated low-discrepancy sequence into first storage means;

(b) in each said processor, expanding an i-th coordinate value $u_n^{(i)}$ ($1 \leq i \leq k$) of an n-th element $(u_n^{(1)}, \ldots, u_n^{(k)})$ of the low-discrepancy sequence in radix b and storing m components generated by the expansion of each said coordinate value in sequence into second storage means, wherein said b is a prime number equal to or more than k;

(c) in each said processor, expanding said number n in radix b and storing the generated expansion $(n_m, n_{m-1}, \ldots, n_1)$ in sequence into third storage means;

(d) in each said processor, scanning said third storage means in sequence and detecting a minimum order j wherein $n_j$ is not equal to b−1;

(e) in each said processor, in response to said scanning and detecting step, reading out j-th row components of a generator matrix $T^{(i)}$ for an i-th coordinate value ($1 \leq i \leq k$) of the low-discrepancy sequence, stored in advance, and said components generated by said expansion of the i-th coordinate value of said n-th element of the low-discrepancy sequence in sequence, and adding said j-th row components and said components generated by said expansion of the i-th coordinate value of the n-th element of the low-discrepancy sequence in module b, both read out in the same order, and storing the result of the addition in sequence into fourth storage means;

(f) in each said processor, inverted-expanding each said m results of the addition in radix b and storing said generated value $u_{n+1}^{(i)}$ into said first storage means;

(g) in each said processor, iterating the steps (b) to (f) so as to store said low-discrepancy sequence from the s+1-th element to the t-th element into said first storage means, wherein said t corresponds to a processing terminate number in the processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$.

12. A computer system for calculating a multiple integral of a function f, comprising:

a plurality of processors; and system control means for transmitting a function $f(x_1, x_2, \ldots, x_k)$ related to k elements and processing assignment information including a processing start number s to each of said processors, each of said processors comprising:

(a) means for receiving said processing assignment information, and generating an element of the low-discrepancy sequence corresponding to said processing start number s ($u_s^{(1)}, \ldots, u_s^{(k)}$), and storing the generated low-discrepancy sequence into first storage means;

(b) means for expanding an i-th coordinate value $u_n^{(i)}$ ($1 \leq i \leq k$) of an n-th element of the low-discrepancy sequence ($u_n^{(1)}, \ldots, u_n^{(k)}$) in radix b, and storing m components generated by the expansion of each said coordinate value in sequence into second storage means, wherein said b is a prime number equal to or more than k;

(c) means for expanding said number n in radix b, and storing said generated expansion ($n_m, n_{m-1}, \ldots, n_1$) in sequence into third storage means;

(d) means for scanning said third storage means in sequence, and detecting a minimum order j wherein $n_j$ is not equal to b−1;

(e) means in response to said means (d) for reading out j-th row components of a generator matrix $T^{(i)}$ for an i-th coordinate value ($1 \leq i \leq k$) of said low-discrepancy sequence, stored in advance, and said components generated by the expansion of said i-th coordinate value of said n-th element of the low-discrepancy sequence in sequence, and adding said j-th row components and said components generated by said expansion in module b, both read out in the same order, and storing the result of the addition in sequence into fourth storage means;

(f) means for inverted-expanding each said m results of the addition in radix b, and storing said generated value $u_{n+1}^{(i)}$ into said first storage means;

(g) means for controlling said means (b) to (f) so as to store said low-discrepancy sequence from the s+1-th element to the t-th element into said first storage means, wherein said t corresponds to a processing terminate number in the relevant processor, and the s+1-th element of the low-discrepancy sequence is ($u_{s+1}^{(1)}, \ldots, u_{s+1}^{(k)}$), and the t-th element of the low-discrepancy sequence is ($u_t^{(1)}, \ldots, u_t^{(k)}$);

(h) means for receiving said function f, and reading out the n-th element ($u_n^{(1)}, \ldots, u_n^{(k)}$) ($s \leq n \leq t$) of the low-discrepancy sequence stored in said first storage means, and calculating a value of $f(u_n^{(1)}, \ldots, u_n^{(k)})$;

(i) means for accumulating said generated values of function $f(u_n^{(1)}, \ldots, u_n^{(k)})$ ($s \leq n \leq t$); and (j) means for transmitting the calculated value accumulated by said means (i) to said system control means;

wherein the system control means accumulates values transmitted from each said processor and divides the accumulated value by the number of the low-discrepancy sequence generated by all said processors.

13. The computer system for calculating a multiple integral of a function f, as set forth in claim 12, wherein said means (a) includes means for calculating a b-radix expansion ($n_m, n_{m-1}, \ldots, n_1$) of said number n and generating the i-th coordinate value $u_n^{(i)}$ of the n-th element of the low-discrepancy sequence by using said vector $v_n = (n_1, \ldots n_{m-1}, n_m)$ generated from the calculation result and the generator matrix $T^{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}.$$

14. A method for calculating a multiple integral of a function f in a computer system having system control means and a plurality of processors, comprising the steps of:

(a) transmitting a function $f(x_1, x_2, \ldots, x_k)$ related to k elements and processing assignment information including a processing start number s to each of said processors from said system control means;

(b) in each said processor, receiving said processing assignment information and generating an element ($u_s^{(1)}, \ldots, u_s^{(k)}$) of the low-discrepancy sequence corresponding to said processing start number s, and storing the generated low-discrepancy sequence into first storage means;

(c) in each said processor, expanding an i-th coordinate value $u_n^{(i)}$ ($1 \leq i \leq k$) of an n-th element ($u_n^{(1)}, \ldots, u_n^{(k)}$) of the low-discrepancy sequence in radix b and storing m components generated by the expansion of each said coordinate value in sequence into second storage means, wherein said b is a prime number equal to or more than k;

(d) in each said processor, expanding said number n in radix b and storing said generated expansion ($n_m, n_{m-1}, \ldots, n_1$) in sequence into third storage means;

(e) in each said processor, scanning said third storage means in sequence and detecting a minimum order j wherein $n_j$ is not equal to b−1;

(f) in each said processor in response to said scanning and detecting step, reading out j-th row components of a generator matrix $T^{(i)}$ stored for an i-th coordinate value ($1 \leq i \leq k$) of the low-discrepancy sequence, stored in advance, and said components generated by the expansion of said i-th coordinate value of said n-th element of the low-discrepancy sequence in sequence and adding said j-th row components and said components generated by said expansion of the i-th coordinate value of the low-discrepancy sequence in module b, both read out in the same order, and storing the results of the addition in sequence into fourth storage means;

(g) in each said processor, inverted-expanding each said m results of the addition in radix b and storing said generated value $u_{n+1}^{(i)}$ into said first storage means;

(h) in each said processor, iterating said steps (c) to (g) so as to store said low-discrepancy sequence from the s+1-th element to the t-th element into said first storage means, wherein said t corresponds to a processing terminate number in the relevant processor, and the s+1-th element of the low-discrepancy sequence is ($u_{s+1}^{(1)}, \ldots, u_{s+1}^{(k)}$), and the t-th element of the low-discrepancy sequence is ($u_t^{(1)}, \ldots, u_t^{(k)}$)

(i) in each said processor, reading out the n-th element ($u_n^{(1)}, \ldots, u_n^{(k)}$) ($s \leq n \leq t$) of the low-discrepancy sequence stored in said first storage means and calculating a value of $f(u_n^{(1)}, \ldots, u_n^{(k)})$;

(j) in each said processor, accumulating said generated values of function $f(u_n^{(i)}, \ldots, u_n^{(k)})$ ($s \leq n \leq t$) in an accumulator;

(k) in each said processor, transmitting the calculated values accumulated by said accumulator to said system control means; and (l) in said system control means, accumulating the value transmitted from each said processor and dividing the accumulated value by the number of the low-discrepancy sequence generated by all said processors.

15. The method for calculating a multiple integral of a function f as set forth in claim 14, wherein said step (b) includes a step of calculating a b-radix expansion ($n_m$, $n_{m-1}$, ..., $n_1$) of said number n, and generating the i-th coordinate value $u_n^{(i)}$ of the n-th element of the low-discrepancy sequence by using said vector $v_n=(n_1, \ldots, n_{m-1}, n_m)$ generated from the calculation result and a generator matrix $T^{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}.$$

16. A system for generating a low-discrepancy sequence, comprising:

a plurality of processors; and means for transmitting processing assignment information including a processing start number s to each of said processors, each of said processors comprising:
(a) means for receiving said processing assignment information;
(b) means for calculating a b-radix expansion of a number n ($n_m$, $n_{m-1}$, ..., $n_1$), and generating an i-th coordinate value $u_n^{(i)}$ of an n-th element of the low-discrepancy sequence by using said vector $v_n = (n_1, \ldots, n_{m-1}, n_m)$ generated from the calculation result and a generator matrix $T_{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}$$

(c) control means for inputting said n ($s \leq n \leq t$) and said generator matrix $T^{(i)}$ ($1 \leq i \leq k$) and said matrix G in said means (b) so that said means (b) generates a low-discrepancy sequence from the s-th element to the t-th element, wherein said s corresponds to said processing start number, and said t corresponds to a processing terminate number in the relevant processor, and s-th element of the low-discrepancy sequence is ($u_s^{(1)}, \ldots, u_s^{(k)}$), and the t-th element of the low-discrepancy sequence is ($u_t^{(1)}, \ldots, u_t^{(k)}$).

17. A method for generating a low-discrepancy sequence in a computer system having system control means with processing assignment information and a plurality of processors, comprising the steps of:
(a) transmitting processing assignment information including a processing start numbers to the plurality of processors from said system control means;
(b) receiving said processing assignment information in said processor;
(c) calculating in said processors a b-radix expansion of a number n ($n_m$, $n_{m-1}$, ... $n_1$), and generating an i-th coordinate value $u_n^{(i)}$ of an n-th element of the low-discrepancy sequence by using said vector $v_n=(n_1, \ldots n_{m-1}, n_m)$ generated from the calculation result and a generator matrix $T_{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}$$

(d) providing in said processors, said n ($s \leq n \leq t$) so that a low-discrepancy sequence from the s-th element ($u_s^{(1)}, \ldots, u_s^{(k)}$) to the t-th element ($u_t^{(i)}, \ldots, u_t^{(k)}$) is generated in said calculating and generating step, and causing to iterate said calculating and generating step, wherein said s corresponds to said processing start number, and said t corresponds to a processing terminate number in the processor.

18. A system for calculating a multiple integral of a function f, the system comprising:

a plurality of processors; and system control means for transmitting a function $f(x_1, x_2, \ldots, x_k)$ related to k elements and processing assignment information including a processing start number s to each of said processors, each of said processors including:
(a) means for receiving said processing assignment information;
(b) means for calculating a b-radix expansion of a number n ($n_m$, $n_{m-1}$, ..., $n_1$), and generating an i-th coordinate value $u_n^{(i)}$ of an n-th element of the low-discrepancy sequence by using said vector $v_n = (n_1, \ldots, n_{m-1}, n_m)$ generated from the calculation result and a generator matrix $T_{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}$$

and storing the result of the generation into storage means;
(c) control means for inputting said n ($s \leq n \leq t$) and said generator matrix $T^{(i)}$ ($1 \leq i \leq k$) and said matrix G in said means (b) so that said means (b) generates a low-discrepancy sequence from the s-th element to the t-th element, wherein said s corresponds to said processing start number, and said t corresponds to a processing terminate number in the relevant processor, and s-th element of the low-discrepancy sequence is ($u_s^{(1)}, \ldots, u_s^{(k)}$), and the t-th element of the low-discrepancy sequence is ($u_t^{(1)}, \ldots, u_t^{(k)}$);
(d) means for receiving said function f, and reading out each coordinate value $u_n^{(i)}$ in response to that ($u_n^{(1)}, \ldots, u_n^{(k)}$) of the low-discrepancy sequence is stored into the storage means, and calculating a value of $f(u_n^{(1)}, \ldots, u_n^{(k)})$;
(e) means for accumulating said generated values of function $f(u_n^{(1)}, \ldots, u_n^{(k)})$ ($s \leq n \leq t$);
(f) means for transmitting the value accumulated by said accumulating means to said system control means; and wherein the system control means accumulates values transmitted from said processor and divides the accumulated value by the number of the low-discrepancy sequence generated by said plurality of processors.

19. A method for calculating a multiple integral of a function f in a computer system having a plurality of processors; and system control means, comprising the steps of:

(a) transmitting a function $f(x_1, x_2, \ldots, x_k)$ related to k elements and processing assignment information including a processing start number s to each of said processors from said system control means;

(b) in each said processor, receiving said processing assignment information;

(c) in each said processor, calculating a b-radix expansion of a number n $(n_m, n_{m-1}, \ldots, n_1)$, and generating an i-th coordinate value $u_n^{(i)}$ of an n-th element of the low-discrepancy sequence by using said vector $v_n = (n_1, \ldots n_{m-1}, n_m)$ generated from the calculation result and a generator matrix $T_{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}$$

and storing the result of the generation into storage means;

(d) in each said processor, providing said n ($s \leq n \leq t$) so that a low-discrepancy sequence from the s-th element $(u_s^{(1)}, \ldots, u_s^{(k)})$ to the t-th element $(u_t^{(1)}, \ldots, u_t^{(k)})$ is generated in step (c), and causing to iterating the step (c), wherein said s corresponds to said processing start number, and said t corresponds to a processing terminate number in the relevant processor;

(e) in each said processor, receiving said function f, and reading out each coordinate value $u_n^{(i)}$ in response to that $(u_n^{(1)}, \ldots, u_n^{(k)})$ of the low-discrepancy sequence is stored into the storage means, and calculating a value of $f(u_n^{(1)}, \ldots, u_n^{(k)})$;

(f) in each said processor, accumulating said generated values of function $f(u_n^{(1)}, \ldots, u_n^{(k)})$ ($s \leq n \leq t$);

(g) in each said processor, transmitting the value accumulated in said accumulating step to said system control means; and (h) accumulating values transmitted from each said processor and dividing the accumulated value by the number of the low-discrepancy sequence generated by all said processors by the system control means.

20. A system for generating a low-discrepancy sequence by computer processing, comprising:

(a) means for holding a value of an n-th element $Y_n$ of the low-discrepancy sequence as a vector that has m components of a b-radix expansion of said $Y_n$, wherein said n is an integer of 1 or greater, and said b is a prime number of 2 or greater;

(b) means for calculating a b-radix expansion $(n_m, n_{m-1}, \ldots n_1)$ of said n, and holding the calculation result as a number n vector $(n_1, \ldots n_{m-1}, n_m)$;

(c) means for scanning each element of said number n vector in sequence, and detecting a minimum element number j wherein $n_j$ is not equal to b–1;

(d) means for adding a j-th row vector of a generator matrix of the low-discrepancy sequence and said vector representing said $Y_n$ in module b based on the detected element number j, and holding the result as an n+1-th element $Y_{n+1}$ of the low-discrepancy sequence.

21. A method for generating a low-discrepancy sequence by computer processing, comprising the steps of:

(a) holding a value of an n-th element $Y_n$ of the low-discrepancy sequence as a vector that has m components of a b-radix expansion of said $Y_n$, wherein said n is an integer of 1 or greater, and said b is a prime number of 2 or greater;

(b) calculating a b-radix expansion $(n_m, n_{m-1}, \ldots, n_1)$ of said n, and holding the calculation result as a number n vector $(n_1, \ldots n_{m-1}, n_m)$;

(c) scanning each element of said number n vector in sequence, and detecting a minimum element number j wherein $n_j$ is not equal to b–1; and (d) adding a j-th row vector of a generator matrix of the low-discrepancy sequence and said vector representing said $Y_n$ in module b based on the detected element number j, and holding the result as an n+1-th element $Y_{n+1}$ of the low-discrepancy sequence.

22. A system for generating a k-dimensional low-discrepancy sequence by computer processing, wherein said k is an integer greater than 1, comprising:

(a) means for holding a value $(u_n^{(1)}, \ldots, u_n^{(k)})$ of an n-th element of the low-discrepancy sequence so that each said element $u_n^{(i)}$ ($1 \leq i \leq k$) is a vector having m components of a b-radix expansion of $u_n^{(i)}$, wherein said n is an integer greater than 1, and said b is a prime number equal to or greater than k;

(b) means for calculating a b-radix expansion $(n_m, n_{m-1}, \ldots n_1)$ and holding the calculation result as a number n vector $(n_1, \ldots n_{m-1}, n_m)$ (c) means for scanning each element of said number n vector in sequence, and detecting a minimum element number j wherein $n_j$ is not equal to b–1; and (d) means for adding a j-th row vector of a generator matrix $T^{(i)}$ for an i-th coordinate value ($1 \leq i \leq k$) of the low-discrepancy sequence and said vector representing a value of $u_n^{(i)}$ in module b based on the detected element number j, and holding the result as the i-th coordinate value $u_{n+1}^{(i)}$ of an n+1-th element of the low-discrepancy sequence.

23. A method for generating a k-dimensional low-discrepancy sequence by computer processing, wherein said k is an integer greater than 1, comprising the steps of:

(a) holding a value $(u_n^{(1)}, \ldots, u_n^{(k)})$ of an n-th element of the low-discrepancy sequence so that each said element $u_n^{(i)}$ ($1 \leq i \leq k$) is a vector having m components of a b-radix expansion of $u_n^{(i)}$, wherein said n is an integer greater than 1, and said b is a prime number equal to or greater than k;

(b) calculating a b-radix expansion $(n_m, n_{m-1}, \ldots n_1)$ and holding the calculation result as a number n vector $(n_1, \ldots n_{m-1}, n_m)$;

(c) scanning each element of said number n vector in sequence, and detecting a minimum element number j wherein $n_j$ is not equal to b–1; and (d) adding a j-th row vector of a generator matrix $T^{(i)}$ for an i-th coordinate value ($1 \leq i \leq k$) of the low-discrepancy sequence and said vector representing a value of $u_n^{(i)}$ in module b based on the detected element number j, and holding the result as the i-th coordinate value $u_{n+1}^{(i)}$ of an n+1-th element of the low-discrepancy sequence.

24. A system for calculating a k-fold multiple integral of a function $f(x_1, x_2, \ldots, x_k)$ by computer processing, wherein said k is an integer greater than 1, comprising:

(a) means for holding a value $(u_n^{(i)}, \ldots, u_n^{(k)})$ of an n-th element of the low-discrepancy sequence so that each said element $u_n^{(i)}$ ($1 \leq i \leq k$) is a vector having m components of a b-radix expansion of $u_n^{(i)}$, wherein said n is an integer greater than 1, and said b is a prime number equal to or greater than k;

(b) means for calculating a b-radix expansion $(n_m, n_{m-1}, \ldots n_1)$ and holding the calculation result as a number n vector $(n_1, \ldots n_{m-1}, n_m)$;

(c) means for scanning each element of said number n vector in sequence, and detecting a minimum element number j wherein $n_j$ is not equal to b−1;

(d) means for adding a j-th row vector of a generator matrix $T^{(i)}$ for an i-th coordinate value ($1 \leq i \leq k$) of the low-discrepancy sequence and said vector representing a value of $u_n^{(i)}$ in module b based on the detected element number j, and holding the result as the i-th coordinate value $u_{n+1}^{(i)}$ of an n+1-th element of the low-discrepancy sequence;

(e) means for calculating a coordinate value $u_{n+1}^{(i)}$ over ($1 \leq i \leq k$) by said means (d) incrementing i from 1 in sequence;

(f) means, in response to the completion of the calculation by said means (e), for adding a value of $f(u_{n+1}^{(1)}, \ldots, u_{n+i}^{(k)})$ to a variable S for storing a integral value; and (g) means for controlling said means (a) through (f) so as to calculate a value of said S from n=1 to n=N, and calculating said k-fold multiple integral value of said function $f(x_1, x_2, \ldots, x_k)$ by dividing the resultant value of said S by said N, said N being a predetermined integer greater than 1.

25. A method for calculating a k-fold multiple integral of a function $f(x_1, x_2, \ldots, x_k)$ by computer processing, wherein said k is an integer greater than 1, comprising the steps of:

(a) holding a value $(u_n^{(1)}, \ldots, u_n^{(k)})$ of an n-th element of the low-discrepancy sequence so that each said element $u_n^{(i)}$ ($1 \leq i \leq k$) is a vector having m components of a b-radix expansion of $u_n^{(i)}$, wherein said n is an integer greater than 1, and said b is a prime number equal to or greater than k;

(b) calculating a b-radix expansion $(n_m, n_{m-1}, \ldots n_1)$ and holding the calculation result as a number n vector $(n_1, \ldots n_{m-1}, n_m)$;

(c) scanning each element of said number n vector in sequence, and detecting a minimum element number j wherein $n_j$ is not equal to b−1;

(d) adding a j-th row vector of a generator matrix $T^{(i)}$ for an i-th coordinate value ($1 \leq i \leq k$) of the low-discrepancy sequence and said vector representing a value of $u_n^{(i)}$ in module b based on the detected element number j, and holding the result as the i-th coordinate value $u_{n+1}^{(i)}$ of a n+1-th element of the low-discrepancy sequence;

(e) incrementing a value of said i and iterating the calculation in said step (d) so that a coordinate value $u_{n+1}^{(i)}$ is calculated over ($1 \leq i \leq k$);

(f) in response to the completion of the calculation in said step (e), adding a value of $f(u_{n+1}^{(1)}, \ldots, u_{n+1}^{(k)})$ to a variable S for storing a integral value; and (g) calculating a value of said S from n=1 to n=N by said step (a) through (f), and calculating said k-fold multiple integral value of said functio n $f(x_1, x_2, \ldots, x_k)$ by dividing the resultant value of said S by said N, said N being a predetermined integer greater than 1.

26. A system for generating a low-discrepancy sequence, comprising:

a plurality of processors; and means for transmitting process assignment information including a process start number s to each of said plurality of processors, each said processor comprising:

(a) means for receiving said processing assignment information and generating and holding an element $(u_s^{(1)}, \ldots, u_s^{(k)})$ of said low-discrepancy sequence corresponding to said processing start number s;

(b) means for holding a value $(u_n^{(1)}, \ldots, u_n^{(k)})$ of an n-th element of the low-discrepancy sequence so that each said element $u_n^{(i)}$ ($1 \leq i \leq k$) is a vector having m components of a b-radix expansion of $u_n^{(i)}$, wherein said n is an integer greater than 1, and said b is a prime number equal to or greater than k;

(c) means for calculating a b-radix expansion $(n_m, n_{m-1}, \ldots n_1)$ and holding the calculation result as a number n vector $(n_1, \ldots, n_{m-1}, n_m)$;

(d) means for scanning each element of said number n vector in sequence, and detecting a minimum element number j wherein $n_j$ is not equal to b−1;

(e) means for adding a j-th row vector of a generator matrix $T^{(i)}$ for an i-th coordinate value ($1 \leq i \leq k$) of the low-discrepancy sequence and said vector representing a value of $u_n^{(i)}$ in module b based on the detected element number j, and holding the result as the i-th coordinate value $u_{n+1}^{(i)}$ of an n+1-th element of the low-discrepancy sequence;

(f) means for controlling said means (b) to (e) so as to store said low-discrepancy sequence from the s+1-th element to the t-th element into storage means, wherein said t corresponds to a processing terminate number in the relevant processor, and the s+1-th element of the low-discrepancy sequence is $(u_{s+1}^{(i)}, \ldots, u_{s+1}^{(k)})$, and the t-th element of the low-discrepancy sequence is $(u_t^{(i)}, \ldots, u_t^{(k)})$.

27. The system for generating a low-discrepancy sequence, as set forth in claim 26, wherein said means (a) includes means for generating the i-th coordinate value $u_n^{(i)}$ of the n-th element of the low-discrepancy sequence by using said number n vector $v_n$ and the generator matrix $T^{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \ (mod \ b).$$

28. A method for calculating a multiple integral of a function f in a computer system having system control means and a plurality of processors, comprising the steps of:

(a) transmitting a function $f(x_1, x_2, \ldots, x_k)$ related to k elements and processing assignment information including a processing start number s to each of said processors from said system control means;

(b) in each said processor, receiving said processing assignment information and generating an element $(u_s^{(1)}, \ldots, u_s^{(k)})$ of the low-discrepancy sequence corresponding to said processing start number s, and storing the generated low-discrepancy sequence into storage means;

(c) in each said processor, holding a value $(u_n^{(1)} \ldots, u_n^{(k)})$ of an n-th element of the low-discrepancy sequence so that each said element $u_n^{(i)}$ ($1 \leq i \leq k$) is a vector having m components of a b-radix expansion of $u_n^{(i)}$, wherein said n is an integer greater than 1, and said b is a prime number equal to or greater than k;

(d) in each said processor, calculating a b-radix expansion ($n_m$, $n_{m-1}$, ... $n_1$) and holding the calculation result as a number n vector ($n_1$, ... $n_{m-1}$, $n_m$);

(e) in each said processor, scanning each element of said number n vector in sequence, and detecting a minimum element number j wherein $n_j$ is not equal to b−1;

(f) in each said processor, adding a j-th row vector of a generator matrix $T^{(i)}$ for an i-th coordinate value ($1 \leq i \leq k$) of the low-discrepancy sequence and said vector representing a value of $u_n^{(i)}$ in module b based on the detected element number j, and holding the result as the i-th coordinate value $u_{n+1}^{(i)}$ of a n+1-th element of the low-discrepancy sequence;

(g) incrementing a value of said i and iterating the calculation in said step (f) so that a coordinate value $u_{n+1}^{(i)}$ is calculated over ($1 \leq i \leq k$);

(h) in each said processor, iterating said steps (c) to (g) so as to store said low-discrepancy sequence from the s+1-th element to the t-th element into said storage means, wherein said t corresponds to a processing terminate number in the relevant processor, and the s+1-th element of the low-discrepancy sequence is ($u_{s+1}^{(1)}$, ... , $u_{s+1}^{(k)}$), and the t-th element of the low-discrepancy sequence is ($u_t^{(1)}$, ... , $u_t^{(k)}$);

(i) in each said processor, reading out the n-th element ($u_n^{(1)}$, ... , $u_n^{(k)}$) ($s \leq n \leq t$) of the low-discrepancy sequence stored in said storage means and calculating a value of $f(u_n^{(1)}, \ldots, u_n^{(k)})$;

(j) in each said processor, accumulating said generated values of function $f(u_n^{(1)}, \ldots, u_n^{(k)})$ ($s \leq n \leq t$) in an accumulator;

(k) in each said processor, transmitting the value accumulated by said accumulator to said system control means; and (l) in said system control means, accumulating the value transmitted from each said processor and dividing the accumulated value by the number of low-discrepancy sequences generated by all said processors.

29. The method for calculating a multiple integral of a function f, as set forth in claim 28, wherein said step (a) includes a step of generating the i-th coordinate value $u_n^{(i)}$ of the n-th element of the low-discrepancy sequence by using said number n vector $v_n$ and the generator matrix $T^{(i)}$ ($1 \leq i \leq k$) and a matrix G $$G = \begin{bmatrix} 1 & -1 & & & \\ & 1 & -1 & & \\ & & \ldots & & \\ & & & 1 & -1 \\ & & & & 1 \end{bmatrix} \pmod{b}.$$

* * * * *